(12) United States Patent
Patel et al.

(10) Patent No.: US 11,660,577 B2
(45) Date of Patent: May 30, 2023

(54) FRACTAL FLOW DISTRIBUTION SYSTEM

(71) Applicant: COMMONWEALTH SCIENTIFIC AND INDUSTRIAL RESEARCH ORGANISATION, Australian Capital Territory (AU)

(72) Inventors: Jim Patel, Australian Capital Territory (AU); Maciej Mazur, Australian Capital Territory (AU); Tejas Bhatelia, Western Australia (AU); Benny Kuan, Australian Capital Territory (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 441 days.

(21) Appl. No.: 16/602,498

(22) PCT Filed: Apr. 20, 2018

(86) PCT No.: PCT/AU2018/050358
§ 371 (c)(1),
(2) Date: Oct. 21, 2019

(87) PCT Pub. No.: WO2018/191787
PCT Pub. Date: Oct. 25, 2018

(65) Prior Publication Data
US 2022/0234013 A1    Jul. 28, 2022

(30) Foreign Application Priority Data

Apr. 21, 2017 (AU) ................................ 2017901465

(51) Int. Cl.
*B01F 25/00* (2022.01)
*B01F 35/71* (2022.01)
(Continued)

(52) U.S. Cl.
CPC .............. *B01F 25/12* (2022.01); *B01F 25/41* (2022.01); *B01F 35/7182* (2022.01);
(Continued)

(58) Field of Classification Search
CPC .......... B01F 2101/59; B01F 2215/0427; B01F 2215/0431; B01F 2215/045;
(Continued)

(56) References Cited

U.S. PATENT DOCUMENTS 2,094,948 A * 10/1937 Hurley ...................... F23K 3/00
137/599.01
2,734,224 A * 2/1956 Winstead ................ B29C 48/70
137/561 A
(Continued)

FOREIGN PATENT DOCUMENTS

EP    1 803 897 A2    4/2007
EP    1 803 897 A3    7/2007
(Continued)

OTHER PUBLICATIONS

Supplementary European Search Report for Application No. EP 18 78 7900.
(Continued)

*Primary Examiner* — Charles Cooley
(74) *Attorney, Agent, or Firm* — Ladas & Parry LLP

(57) ABSTRACT

A flow distribution system for distributing and dividing the flows of at least two separate fluids, the distribution system comprising: a three-dimensional nested structure of at least two fluid transporting fractals comprising at least a first fluid transporting fractal and a second fluid transporting fractal, each fluid transporting fractal having a respective fluid inlet which bifurcates to a plurality of fluid outlets, each fluid transporting fractal being configured to facilitate a flow therethrough independent from a flow in the other fluid
(Continued)

transporting fractal, each fluid transporting fractal extending along and about a central axis between fluid inlet and a plurality of fluid outlets; wherein each fluid transporting fractals comprises of a series of recursive bifurcation units assembled in a selected number of stages, each bifurcation unit comprising a Y-shaped bifurcated element which is fluidly connected to two successive bifurcation units, each successive bifurcation unit being rotated relative to the central axis by an angle of between 60 and 120 degrees relative to the previous stage; each fluid transporting fractal is intertwined with the other fluid transporting fractal; each fluid transporting fractal is positioned offset from the other fluid transporting fractal about the central axis and are arranged such that each fluid outlet from one of the fluid transporting fractals is located adjoining a fluid outlet of the other fluid transporting fractal, and each fluid transporting fractal is centered about a flow axis which is laterally inclined from greater than 0 to 20 degrees from the central axis and longitudinally inclined from greater than 0 to 20 degrees from the central axis.

20 Claims, 23 Drawing Sheets

(51) Int. Cl.
  *B01F 25/41*    (2022.01)
  *B33Y 80/00*    (2015.01)
  *B01F 101/59*   (2022.01)
(52) U.S. Cl.
  CPC ..... *B01F 2101/59* (2022.01); *B01F 2215/045* (2013.01); *B01F 2215/049* (2013.01); *B01F 2215/0427* (2013.01); *B01F 2215/0431* (2013.01); *B33Y 80/00* (2014.12)
(58) Field of Classification Search
  CPC .... B01F 2215/049; B01F 25/12; B01F 25/41; B01F 35/7182; B33Y 80/00; B22F 10/25; B22F 5/10; B22F 10/28; B01J 2219/00898; B01J 19/0093; F23D 2900/14641; F23D 14/02; F23D 14/22; F28F 2210/02; Y02P 10/25; F23K 5/005; F23L 99/00
  See application file for complete search history.

(56) References Cited

U.S. PATENT DOCUMENTS

| | | | | |
|---|---|---|---|---|
| 3,034,526 | A * | 5/1962 | O'Brien | D01D 5/32 137/340 |
| 3,205,939 | A * | 9/1965 | Huet | F22B 1/16 976/DIG. 198 |
| 3,381,336 | A * | 5/1968 | Wells | D01D 1/06 425/382.2 |
| 4,537,217 | A * | 8/1985 | Allen, Jr. | B01J 19/0093 137/561 A |
| 5,938,333 | A * | 8/1999 | Kearney | B01F 25/00 366/DIG. 3 |
| 6,333,019 | B1 * | 12/2001 | Coppens | B01F 35/7182 261/DIG. 70 |
| 6,616,327 | B1 * | 9/2003 | Kearney | B01F 35/7182 366/340 |
| 6,742,924 | B2 | 6/2004 | Kearney | |
| 7,014,442 | B2 * | 3/2006 | Haynes | D01D 4/06 425/464 |
| 7,032,894 | B2 | 4/2006 | Adusei et al. | |
| RE42,882 | E * | 11/2011 | Kearney | B01J 19/24 138/42 |
| 8,511,889 | B2 * | 8/2013 | Choikhet | G01N 30/34 138/40 |
| 9,383,344 | B2 * | 7/2016 | Klepp | G01N 30/6017 |
| 10,118,140 | B2 * | 11/2018 | Vassilicos | F15D 1/025 |
| 10,267,515 | B2 * | 4/2019 | Adriany | F23D 14/22 |
| 11,031,312 | B2 * | 6/2021 | Poltorak | H05K 7/20136 |
| 11,209,222 | B1 * | 12/2021 | Colson | B33Y 80/00 |
| 2002/0062648 | A1 | 5/2002 | Ghoshal | H01L 23/427 165/104.33 |
| 2002/0196706 | A1 * | 12/2002 | Kearney | F28F 9/0275 138/42 |
| 2003/0039169 | A1 * | 2/2003 | Ehrfeld | B01J 19/0093 366/340 |
| 2004/0126454 | A1 * | 7/2004 | Haynes | D01D 1/06 425/464 |
| 2005/0000879 | A1 * | 1/2005 | Kearney | B01J 8/0278 210/287 |
| 2007/0297285 | A1 * | 12/2007 | Cross | B01F 25/40 366/340 |
| 2009/0162731 | A1 | 6/2009 | Gaudillat et al. | |
| 2012/0074051 | A1 * | 3/2012 | Gebauer | G01N 30/6017 29/890.09 |
| 2013/0206374 | A1 * | 8/2013 | Roisin | F28D 7/0041 165/165 |
| 2013/0208560 | A1 * | 8/2013 | Kulkarni | B01F 27/96 366/343 |
| 2016/0271610 | A1 * | 9/2016 | Foulds | B01F 23/811 |
| 2017/0248372 | A1 * | 8/2017 | Erno | F28D 9/0012 |
| 2018/0266770 | A1 * | 9/2018 | Wagner | F28D 7/0025 |
| 2019/0358367 | A1 * | 11/2019 | Vacanti | A61L 27/14 |
| 2020/0041212 | A1 * | 2/2020 | Palmer | F28F 1/025 |
| 2020/0263928 | A1 * | 8/2020 | Joseph | F28D 1/0246 |
| 2020/0284516 | A1 * | 9/2020 | Becene | F28D 7/1638 |
| 2020/0284518 | A1 * | 9/2020 | Becene | F28D 7/02 |
| 2021/0071964 | A1 * | 3/2021 | Ruiz | F28F 9/0263 |
| 2021/0190443 | A1 * | 6/2021 | Sawicki | F28F 1/006 |
| 2021/0216683 | A1 * | 7/2021 | Rai | B29C 64/386 |
| 2021/0231379 | A1 * | 7/2021 | Horoszczak | F28F 9/0275 |
| 2021/0231381 | A1 * | 7/2021 | Horoszczak | F28D 7/16 |
| 2021/0231383 | A1 * | 7/2021 | Horoszczak | F28D 7/16 |
| 2021/0339889 | A1 * | 11/2021 | Army | B64D 33/08 |
| 2022/0232732 | A1 * | 7/2022 | Alvarado | F28D 1/0246 |
| 2022/0370973 | A1 * | 11/2022 | Hirschberg | B01F 35/896 |
| 2022/0379233 | A1 * | 12/2022 | Hirschberg | B01D 3/008 |

FOREIGN PATENT DOCUMENTS

| | | | | |
|---|---|---|---|---|
| EP | 3705826 | A1 * | 9/2020 | F02C 7/14 |
| EP | 3705827 | A1 * | 9/2020 | F28D 1/0472 |
| EP | 3705828 | A1 * | 9/2020 | F02C 7/14 |
| EP | 3800417 | A1 * | 4/2021 | B33Y 80/00 |
| EP | 3825638 | A1 * | 5/2021 | B23P 15/26 |
| EP | 3842723 | A1 * | 6/2021 | B33Y 80/00 |
| JP | 2011 206678 | A | 10/2011 | |
| JP | 2011206678 | A | 10/2011 | |
| KR | 20220153975 | A * | 11/2022 | |
| WO | WO-0066257 | A1 * | 11/2000 | B01F 15/0264 |
| WO | WO-2010138061 | A1 * | 12/2010 | B01D 15/14 |
| WO | WO-2018191787 | A1 * | 10/2018 | B01F 15/0264 |
| WO | WO-2020018067 | A1 * | 1/2020 | |

OTHER PUBLICATIONS

ISR for International Application No. PCT/AU2018/050358.
Written Opinion for International Application No. PCT/AU2018/050358.
Jason Cho, et al., "Nature-Inspired Fractal Flow Field for PEM Fuel Cells", 2016 AIChE Annual Meeting, (Nov. 16, 2016), URL: https://aiche.confex.com/aiche/2016/webprogram/Paper461692.html, (May 19, 2017) [A] 1-65 Whole document.
Examination report dated Jun. 24, 2021 issued by Indian Patent Office on corresponding patent application 201917047325.

* cited by examiner (i) (ii) (iii)

(i) (ii) (iii)

(a)  (b)

(c)

(b)

FRACTAL FLOW DISTRIBUTION SYSTEM

CROSS-REFERENCE

This application is an application under 35 U.S.C. 371 of International Application No. PCT/AU2018/050358 filed on 20 Apr. 2018. The present application claims priority from Australian provisional patent application No. 2017901465 filed on 21 Apr. 2017, the contents of which should be understood to be incorporated into this specification by this reference.

TECHNICAL FIELD

This invention relates to fluid flow distribution system for splitting a fluid flow path into multiple parallel flow streams. The flow distribution system is particularly applicable as a flow distribution system for a monolithic reactor, reactors comprising said flow distribution systems, fluid mixers, fluid blenders, Taylor flow mixers, catalytic reactors and converters, fuel mixers and/or burners or the like and it will be convenient to hereinafter disclose the invention in relation to those exemplary applications. However, it should be appreciated that the flow distribution system of the present invention can be used in any number of other fluid flow splitting and/or distribution applications.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Flow distribution systems which achieve uniform division of inlet fluid flow into multiple outlets are a common functional requirement in a range of fluid handling applications, across a variety of industries. For example, in chemical reactors utilizing monolith catalyst support devices, system efficiency is dependent on the ability to achieve uniform distribution of flow over many closely-packed parallel channels separated by thin walls coated with catalytically active substances. For applications requiring fluid mixing at small scale quantities, the ability to achieve flow division and uniform distribution of two inlet fluid streams in close proximity is often also required.

Distribution system designs that address uniform flow distribution application requirements generally fall into two broad categories of flow division schemes:
A. Parallel: where flow division occurs in a single stage, through manifolds with multiple ports along a fluid chamber (for example as shown in FIG. 1(A)); or
B. Sequential: where flow division occurs over a number of stages, through a structured array of sequential bifurcations (for example as shown in FIG. 1(B)).

The parallel scheme has inherent geometric and manufacturing simplicity. However, this scheme also typically has a tendency to produce uneven or mal-distribution flow.

The sequential scheme is generally implemented with a fractal bifurcation approach which connects multiple channel bifurcations in sequential stages, creating a branching cascade of the feeding stream. The term fractal used in the flow distribution system context refers to geometry which exhibits repeating structural patterns at varying scales. Due to a high level of control over flow paths, fractal flow distribution schemes can exhibit higher flow uniformity and reduced pressure loss compared to common parallel manifold approaches. As such, fractal-like space-filling structures often also evolve in natural fluid transport systems such as plant branches and blood vessel. Nevertheless, due to the comparatively higher geometric complexity, fractal flow distribution system embodiments pose increased design and manufacturing challenges. Additional, the ability to achieve high flow uniformity across many, densely packed outlets and multiple flow streams has been limited in practice, often by design compromises required to satisfy traditional manufacturing process constraints.

For example, manufacturing restrictions can lead to the use of perpendicular junctions, in particular, perpendicular bifurcation junctions, which can increase pressure drop due to flow turning losses. Examples of perpendicular flow junctions include:

U.S. Pat. No. 7,032,894 discloses a flow distribution system for monolithic reactors in which fluid reactants are introduced into a reactor and mixed together prior to being successively split into smaller multiple flow streams prior to the mixed reactants entering the reaction zone within a monolithic bed. The flow distribution system comprises a stack of monolith segments, the monolith segments having different cell densities and stacked in order of increasing cell density in the gravitationally downward direction of liquid flow so as to successively split the liquid flow stream into smaller liquid flow streams. Such a flow distribution system configuration cannot be used to distribute two parallel streams, as the flow path between successive layers of monolith segments is not fluidly separated or segregated. This distributor configuration can also result in each of the multiple streams of reactants entering the reaction zone had its own particular compositional and temperature profile reflective of the unique journey that each stream had endured. Consequently, optimal steady reaction conditions were often difficult to maintain with reactor yields and reaction rates reflecting this.

U.S. Pat. No. 6,742,924 teaches a flow distribution system for separate and simultaneous flow division and mixing of two or more independent and offset fluid transporting fractals. The flow divider divides the independent fluid transporting fractals having a respective fluid inlet which bifurcates to a plurality of fluid outlets. The exemplified fluid transporting fractals have a perpendicular bifurcation shape (H-shaped) and are positioned offset (set on different planes) from one another. A merging channel interconnects a first output of the first fluid transporting fractal to a respective second output of the second fluid transporting fractal enabling fluid exiting the first output of said first fluid transporting fractal to mix with fluid exiting said second output of said second fluid transporting fractal in an environment isolated from fluids exiting said outputs other than said first and second outputs. Whilst the offset nature of this flow divider provides a practical nesting solution, the linear and perpendicular nature of the flow distribution system restricts the geometry of the distributor and thus any optimisation of packing density of the configuration. The perpendicular nature of the flow distribution system can also increase the pressure drop through each fluid transporting fractal, particularly in smaller liquid flow streams.

Whilst there has been an improvement in the field, there is still a need for an improved flow distribution system or distributor into which two separate flow streams can be fed that provides safe, efficient performance using a range of fluid reactants, gaseous and/or liquid.

SUMMARY OF THE INVENTION

In a first aspect of the present invention, there is provided a flow distribution system for distributing and dividing the flows of at least two separate fluids, the distribution system comprising:
- a three-dimensional nested structure of at least two fluid transporting fractals comprising at least a first fluid transporting fractal and a second fluid transporting fractal, each fluid transporting fractal having a respective fluid inlet which bifurcates to a plurality of fluid outlets, each fluid transporting fractal being configured to facilitate a flow therethrough independent from a flow in the other fluid transporting fractal, each fluid transporting fractal extending along and about a central axis between fluid inlet and a plurality of fluid outlets;
- wherein each fluid transporting fractals comprises of a series of recursive bifurcation units assembled in a selected number of stages, each bifurcation unit comprising a V-shaped bifurcated element which is fluidly connected to two successive bifurcation units, each successive bifurcation unit being rotated relative to the central axis by an angle of between 60 and 120 degrees relative to the previous stage;
- each fluid transporting fractal is intertwined with the other fluid transporting fractal;
- each fluid transporting fractal is positioned offset from the other fluid transporting fractal about the central axis and are arranged such that each fluid outlet from one of the fluid transporting fractals is located adjoining a fluid outlet of the other fluid transporting fractal, and
- each fluid transporting fractal is centered about a flow axis which is laterally inclined from greater than 0 to 20 degrees from the central axis and longitudinally inclined from greater than 0 to 20 degrees from the central axis.

The present invention, therefore, provides a flow distribution system which combines at least two sequential flow division schemes (i.e. the fluid transporting fractals) to achieve high outlet flow uniformity and packing density, for one or two separate fluid inlet streams. A fractal bifurcation scheme according to the present invention is able to distribute flow uniformly over a large area from a single inlet. The defined arrangement of the fluid outlets allows for two independent fluid streams to be outputted from the fluid distributor, and in embodiments, easily mixed at the outlet in small volumes. The symmetry of fluid streams achieves equal flow conditions between fluid transporting fractals. It also allows the mixing of fluid streams to be achieved with an optional dedicated downstream mixing section. The fractal bifurcation scheme of the present invention, therefore, provides the following characteristics:
- Ability to accommodate two flow streams with preferably symmetric flow paths within the outlet area footprint;
- Freedom in nesting due to the two fluid transporting fractal channels being intertwined in three dimensions as opposed to planar intertwining;
- Low pressure loss compared to a number of prior art fractal bifurcation embodiments. The proposed design offers reduced pressure loss due to rounded rather than perpendicular bifurcation junctions; and
- High flow uniformity.

The fluid transporting fractals are intertwined in a positioned offset from the other fluid transporting fractal about the central axis in order to position and pack the two fluid transporting fractals within a compact space. This offset position can be achieved through a combination of positional offset and axial or angular offset relative to the central axis. In embodiments, the flaw axis of each fluid transporting fractal is spaced offset from the central axis. It is to be understood that the central axis defines the vertical axis of the overall flow distribution system.

Preferably, the flow axis of each fluid transporting fractals is laterally and longitudinally spaced apart about the central axis. This positions each fluid transporting fractal on opposite quadrants (diagonally opposite quadrants) on X-Z plane about the central axis of the system. That spacing is generally determined based on the size of the systems, number of split stages (N), stage position of the transition plane (e.g. typically the transition plane is positioned at j=4 as in the embodiment depicted in the attached figures) and the associated bifurcation unit spacing $S_j$, channel wall thickness, fluid properties and flow properties required for the system. However, in embodiments the lateral offset $C_{t_u}$ of the flow axis of each fluid transporting fractal from the central axis is between:

$$-\frac{S_j}{2} \le C_{t_u} \le \frac{S_j}{2}$$

wherein $S_j$ is the bifurcation unit spacing. Similarly, in embodiments the longitudinal offset $C_{t_v}$ of the flow axis of each fluid transporting fractal from the central axis is between:

$$-\frac{S_j}{2} \le C_{t_v} \le \frac{S_j}{2}$$

wherein $S_j$ is the bifurcation unit spacing.

It should be appreciated that the bifurcation unit spacing $S_j$ is the perpendicular projection length between the center of the inlet and outlet diameters of each bifurcation unit. In embodiments, the bifurcation unit spacing $S_j$ is determined by:

$$S_{N_e} = \frac{L}{2^{(N/2+1)} - 2}$$

$$S_{j_e} = S_{N_e} \cdot 2^{(N_e - j_e)/2}$$

$$S_{j_\sigma} = S_{N_e} \cdot 2^{(N_e - j_\sigma - 1)/2}$$

$S_N$: Bifurcation unit spacing of final stage $N$[mm]

$L$: Outlet stage edge length[mm]

$S_j$: Bifurcation unit spacing of stage $j$[mm]

It should be noted that the subscript symbols e and σ are used to denote equation validity only for either even or odd numbers, respectively. For example, $S_{j_e}$ denotes the value of parameter $S_j$ for j being even. $S_{j_e}$ is not valid for j being odd. Moreover, outlet stage edge length L is the linear length of an edge of the geometric formation in which the outlets of the outlet stage are distributed. Where the outlet geometric formation is square (i.e. all the outlets are distributed in a square grid), the edge length L=Lx=Ly (see for example FIG. 2).

The flow axis of each fluid transporting fractal is inclined by an angle relative to the central axis. This enables each fluid transporting fractal to bend or be angled away from the central axis to accommodate and intertwine the various and larger sized channels of the distributor in the earlier stages. Additionally, the inclination of the flow axes allow for clearance at assembly inlet without compromising inlet flow conditions. Each fluid transporting fractal is centered about a flow axis which is laterally inclined ($\theta_{t_{xz}}$) $0 \leq \theta_{t_{xz}} \leq 20$, preferably between 2 and 20 degrees, preferably between 4 and 10 degrees from the central axis and longitudinally inclined ($\theta_{t_{yz}}$), $0 \leq \theta_{t_{yz}} \leq 20$, preferably between 2 and 20 degrees, preferably between 4 and 10 degrees from the central axis. The respective incline and offset of each fluid transporting fractal are preferably mirrored about the central axis, preferably symmetrically mirrored about the central axis. More preferably, the layout of the channel pathways is symmetric relative to the central axis and flow axis of each respective fluid transporting fractal. This provides symmetry to the fluid streams about the central axis which can achieve equal flow conditions between fluid transporting fractals. However, it should be appreciated that the layout can also be structured asymmetrically to achieve intentionally different flow conditions.

The fluid outlet of each fluid transporting fractal and of the flow distribution system as a whole are preferably located and aligned in a single plane relative to the central axis. This enables all the outlets to aligned, simplifying the addition and coupling of downstream design such as the addition of further fractal bifurcating stages, mixing or reactor stages or systems. In embodiments, each fluid outlet is located in an outlet plane orientated relative to the central axis, preferably perpendicular to the central axis and each fluid transporting fractal includes a transition conduit configured to direct and realign the flow path of each transporting fractal into the outlet plane. In embodiments, the fluid outlets are arranged in a square aspect ratio, preferably in an even number array. For example 8×8 array of outlets. However, it should be appreciated that the fluid outlets can be arranged in any desired shape, including polygons, regular polygons or the like. In some embodiments, the fluid outlets are arranged in a rectangular configuration. It should be appreciated that the number of stages or split stages of bifurcation units can be any suitable number, for example between 1 to 10 or more. Examples include 2, 3, 4, 5, 6, 7 or 8 stages.

It should be appreciated that a number of device and process parameters influence the formation of uniform flow through the flow distribution system, and in particular produced through the fluid outlets of each fluid transporting fractal. For uniform flow through the fluid transporting fractals, it is preferable for one or more of the following conditions be met:

the flow area transfer ratio to be equal to 1 through each of the stages of the flow distribution system;

the Reynolds number is preferably <100,000, preferably between 1000 and 100,000, more preferably between 1500 and 80000, yet more preferably between 5000 and 50000; However, it should be appreciated that the flow distribution system can work over both laminar and turbulent Re values. For a given diameter and surface roughness, a higher Re in a tube/channel typically reduces the Darcy-Weisbach friction factor which is directly proportional to pressure loss. However, for a given fluid, a higher Re requires a higher flow velocity (v) which increases pressure loss by v^2. As such, for a given channel and fluid, an increasing Re value in the turbulent regime (~>3000) can increase pressure loss.

the fluid outlets have a distribution density ranging from 10000 to 15000 outlets per m$^2$, preferably about 12175 points/m$^2$; and/or the flow distribution system has a downturn ratio of at least 50, preferably at least 100 i.e. the maximum flow rate is 100 times that of the minimum ($Re_{max}/Re_{min}$=1E5/E3).

The resulting flow through the flow distribution system is preferably uniform. In embodiments, the flow of the system substantially approaches a plug flow type flow pattern.

Frictional pressure losses through the fluid distributor are limited through the design by reducing abrupt flow path transitions and providing maximum feasible channel diameters. The configuration of the bifurcated channels of the fluid distributor is therefore Y-shaped bifurcated element preferably comprising an inlet channel and two outlet channels which provide a curved fluid flow path between the inlet and outlet thereof. The curved flow path can have any suitable curved configuration. In some embodiments, the curved flow path comprises an acute arc. The two curved flow paths of each bifurcated element preferably form an arch with the inlet located at the peak of the arch. The angle between each channel or leg in a bifurcation unit comprises the bifurcation angle $\theta_j$. That bifurcation angle is selected to provide a suitable flow split, with suitable flow properties and to accommodate the requisite packing and geometry of the intertwined fluid transporting fractals. In embodiments, each bifurcation unit has a bifurcation angle $\theta_j$ of between 30 and 60 degrees, preferably between 30 and 40 degrees more preferably about 35 degrees.

Each successive bifurcation unit forming each fluid transporting fractal is rotated relative to the central axis by an angle of between 60 and 120 degrees. It is noted that the angle of the bifurcation unit is rotated relative to the previous stage should be within a certain range to provide a substantially symmetric flow resistance to the bifurcating flow to assist the maintenance of a uniform flow through each of the channels of the respective fluid transporting fractal and the overall flow distribution system. Whilst not wishing to be limited to any one theory, it is thought that flow uniformity would be proportionally affected by this bifurcation unit rotation angle. The degree that would not "substantially" affect uniform flow depends on the required level of flow uniformity. In preferred embodiments, each successive bifurcation unit forming each fluid transporting fractal is rotated relative to the central axis by an angle of between 70 and 110 degrees, preferably 80 and 100 degrees, and more preferably substantially 90 degrees relative to the previous stage. In some embodiments, each successive bifurcation unit forming each fluid transporting fractal is rotated relative to the central axis by 90 degrees relative to the previous stage.

The repeating fractal unit of each fluid transporting fractal can comprise any suitable fractal shape. In embodiments, two fluidly connected and adjoining bifurcation units form an H-shaped fractal unit.

The geometry and configuration of the bifurcation units and the formed fractal units are important to the packing and intertwined form of the flow distribution system. The diameters of the inlets and outlets of connected bifurcation units are therefore one consideration. Preferably, the inlet diameter to stage j+1 is equal to the outlet diameter of bifurcation stage j, wherein is the Bifurcation stage index. In embodiments, the diameter changes linearly between each bifurcation stage in order to provide a gradual flow path transition and thereby reduced frictional fluid pressure losses. The bifurcation unit spacing $S_j$ is preferably conserved when transitioning between an odd and even stage index, and halved when transitioning between even and odd stages in order to achieve a square aspect ratio of the device outlet channels. For a non-square aspect ratio, the conservation requirement does not apply.

In some embodiments of the present invention, a straight channel section is introduced between sequential bifurcation units to allow the flow to recover to axisymmetric conditions after passing through the bifurcation bends which can introduce shear flow components into the flow profile. These shear components can cause asymmetry in distribution when the flow enters the next bifurcating stage. In such embodiments, the length to diameter ratio (L/D) of the transition length of channel between bifurcations of a first bifurcation unit and a subsequent bifurcation unit in each fluid transporting fractal is also another geometric consideration. This L/D ratio is preferably at least 5, preferably from 5 to 100, more preferably from 5 to 20, and yet more preferably about 10, where L is the length between respective bifurcations in a first bifurcation unit and a subsequent bifurcation unit and D is the average outer diameter of the respective conduit extending between bifurcations in a first bifurcation unit and a subsequent bifurcation unit.

In some embodiments, each fluid transporting fractal includes a straightening section configured to align the flow conduits of the fluid transporting fractal from alignment with the flow axis of that fluid transporting fractal, to the central axis and fluid outlet plane. The straightening section can be followed by a straight section (or straight flow section) which is preferably adjustable in length (when required to recover flow conditions after straightening section). It should be appreciated that all bifurcation units of each flow distribution system can have same dimensional proportions or be independently varied.

It should be appreciated that the flow distribution system comprises an even number of flow distribution system stages. Within the inherent geometric relationships of the fractal flow distribution system embodiment, achieving a uniform distribution of outlets in a square fill area with edge length L requires an even number of bifurcation stages.

One consideration in the design of the present fluid flow distribution system is its ability to couple with the second unit in a mixer application to act as a feeder through the discharge of the two separate fluid flows through two interleaved matrices of regularly spaced fluid outlets. The fluid flow distribution systems are arranged such that each individual fluid outlet is located right next to its mixing partner that supplies a different fluid species. This places a strict requirement on the location and orientation of the channel bifurcations so the two fluid transporting fractals can be 'nested' together. This also limited the maximum number of split stages in a unit. For mixing, two separate streams from the fluid outlets are combined such that the components of separate streams are reacted/mixed. In embodiments, the flow distributor of the present invention further includes a mixer in which at least one fluid outlet from the first fluid transporting fractal is mixed with the fluid from at least one fluid outlet of the second fluid transporting fractal. The fluid from a fluid outlet from the first fluid transporting fractals is preferably mixed with the fluid from said adjoining fluid outlet of the second fluid transporting fractal.

It should be appreciated that the flow distribution system of the present invention can be formed by any suitable manufacturing method. However, given the complexity of the geometry and flow scheme of the present invention the flow distribution system of the present invention preferably comprises an additively manufactured product, preferably using Selective Laser Melting, Stereolithography, Material Jetting, Selective Laser Sintering, or Direct Energy Deposition techniques.

A second aspect of the present invention provides a method of dividing at least two separate flow streams, comprising:
    feeding two separate flow streams into the first fluid transporting fractal and second fluid transporting fractal of the flow distribution system according to the first aspect of the present invention;
    thereby producing a plurality of outlet flows from each of the fluid outlets of each of the fluid transporting fractals.

A third aspect of the present invention provides a method of designing a flow distribution system for distributing and dividing the flows of at least two separate fluids comprising a three-dimensional nested structure, the method comprising:
    determining the number of flow distribution system stages;
    selecting a recursive bifurcation unit, comprising a Y-shaped bifurcated element which is fluidly connected to two successive bifurcation units to be assembled in the selected flow split stages; and
    assembling each successive bifurcation unit into two fluid transporting fractals having the selected number of flow distribution system stages, each fluid transporting fractals extending along and about a central axis between the fluid inlet and a plurality of fluid outlets, such that:
        each successive bifurcation unit is orientated so that it is rotated relative to the central axis by an angle of between 60 and 120 degrees relative to the previous stage each fluid transporting fractal being configured to facilitate a flow therethrough independent from a flow in the other fluid transporting fractal,
        each fluid transporting fractal is arranged such that each fluid outlet from one of the fluid transporting fractals is located adjoining a fluid outlet of the other fluid transporting fractal, and
        each fluid transporting fractal is intertwined with the other fluid transporting fractal; and
        each fluid transporting fractal is positioned offset from the other fluid transporting fractal about the central axis and are arranged such that each fluid outlet from one of the fluid transporting fractals is located adjoining a fluid outlet of the other fluid transporting fractal; and
    each fluid transporting fractal is centered about a flow axis which is laterally inclined from greater than 0 to 20 degrees from the central axis and longitudinally inclined from greater than 0 to 20 degrees from the central axis.

The designed flow scheme comprises fractal bifurcation. Performance can be predicted using an extensive numerical study and subsequently validated using experimental testing, for example using additively manufactured polymer prototypes.

As discussed in relation to the first aspect of the present invention, the offset position can be achieved through a combination of positional offset and axial or angular offset relative to the central axis. In embodiments, in the assembly step, the flow axis of each fluid transporting fractal is spaced offset preferably laterally and longitudinally spaced offset from the central axis as discussed above. Each fluid transporting fractal is centered about a flow axis which is laterally inclined from greater than 0 to 20 degrees, preferably between 4 and 10 degrees from the central axis and longitudinally inclined from greater than 0 to 20 degrees, preferably between 4 and 10 degrees from the central axis. In some embodiments, the method further includes the step of arranging the fluid outlets in a square aspect ratio, preferably in an even number array. For example 8×8 array of outlets. However, again it should be appreciated that other configurations are possible, for example, rectangular or other polygons.

Again, each successive bifurcation unit forming each fluid transporting fractal is rotated relative to the central axis by an angle of between 60 and 120 degrees. It is noted that the angle of the bifurcation unit is rotated relative to the previous stage should be within a certain range to provide a substantially symmetric flow resistance to the bifurcating flow to assist the maintenance of a uniform flow through each of the channels of the respective fluid transporting fractal and the overall flow distribution system. Whilst not wishing to be limited to any one theory, it is thought that flow uniformity would be proportionally affected by this bifurcation unit rotation angle. The degree that would not "substantially" affect uniform flow depends on the required level of flow uniformity. In preferred embodiments, each successive bifurcation unit forming each fluid transporting fractal is rotated relative to the central axis by an angle of between 70 and 110 degrees, preferably 80 and 100 degrees, and more preferably substantially 90 degrees relative to the previous stage. In some embodiments, each successive bifurcation unit forming each fluid transporting fractal is rotated relative to the central axis by 90 degrees relative to the previous stage.

The geometry of the bifurcation units and the formed fractal units can influence the design. In embodiments, in the selection step, each Y-shaped bifurcated element comprises an inlet channel and two outlet channels which provide a curved fluid flow path between the inlet and outlet thereof. Similarly, in some embodiments, in the assembly step, the selected bifurcation units are assembled to form an H-shaped fractal unit. Each bifurcation unit preferably has a bifurcation angle of between 30 and 60 degrees, preferably between 30 and 40 degrees, more preferably about 35 degrees. The surface of each fluid transporting fractal may also preferably be designed with inclination angles of ≥30 degrees from a horizontal plane positioned perpendicular to the central axis. This assists in additive manufacturing of the flow distribution system.

In selected embodiments, in the assembly step, the length to diameter (L/D) ratio of the transition length of conduit between bifurcations of a first bifurcation unit and a subsequent bifurcation unit in each fluid transporting fractal is preferably at least 5, preferably from 5 to 100, more preferably from 5 to 20, and yet more preferably about 10, where L is the length between respective bifurcations in a first bifurcation unit and a subsequent bifurcation unit and D is the average outer diameter of the respective conduit extending between bifurcations in a first bifurcation unit and a subsequent bifurcation unit.

It should be appreciated that a number of other parameters can be considered in order to determine the overall properties and geometry of each fluid transporting fractal and the overall flow distribution system. In the determining step, the desired flow rate of the system and fluid properties of the system are preferably also determined, and these parameters are used to determine the conduit diameter and overall dimensions of the flow distribution system in the selecting step. It is to be understood that the overall dimensions include outlet stage edge length L of the fluid outlets geometric formation. For example, where the outlet geometric formation is square (i.e. all the outlets are distributed in a square grid, the edge length $L=L_x=L_y$ (see for example FIG. 2).

Again, the flow distribution system of the present invention can be formed by any suitable manufacturing method. However, in preferred embodiments the flow distribution system is manufactured using an additive manufacturing system. In embodiments, the method can further comprise the step of: 3D printing the designed flow distribution system, preferably using selective Laser Melting.

It should be appreciated this third aspect of the present invention can include the above-defined features discussed in relation to the first aspect of the present invention and vice versa. In this respect, a flow distribution system according to the first aspect of the present invention can be designed using a method according to any one of the third aspect of the present invention.

In embodiments, the flow distribution system of the first aspect of the present invention can be utilised as part of a Taylor flow mixing device. A fourth aspect of the present invention provides a Taylor flow mixer for forming a Taylor flow within a fluid comprising:
 an inlet zone comprising two or more inlets for receiving at least two separate fluid feeds;
 a distribution zone including a flow distribution system according to the first aspect of the present invention, the flow distribution system providing a plurality of distribution channels for distributing the respective fluid feeds separately into successive channels of increasing cell density;
 a mixing zone comprising a plurality of mixing channels for receiving and mixing the respective separate fluids from the output of the distribution channels into at least one product channel to form a Taylor flow comprising the two fluids therein.

The Taylor flow mixing device according to this fourth aspect of the present invention generates an even flow that is spatially aligned and has even flow outlets from the flow distribution system that are nested with large cell density, enabling Taylor flow generation along a number of aligned conduits from a common fluid feed. Advantageously, the flow distribution system of the present invention allows for accurate and uniform duplication of the hydrodynamic parameters required for Taylor flow in each of the fluid outlets exiting the distribution zone. The uniform and equal repeatable distribution of the flow split allows the Taylor flow conditions to be replicated in each of the fluid outlets from the distribution zone.

Taylor flow can be formed using a variety of fluid feeds. In embodiments, at least a two separate fluid feeds fed into the distribution zone comprises at least one of a gas and a liquid; a liquid and a liquid; or a gas and a liquid-solid phase. Examples include a suspension or other solid-liquid dispersion.

In the mixing zone, two separate streams from the fluid outlets from the distribution zone are combined such that the components of separate streams are mixed to form Taylor flow. The mixing zone preferably comprises a flow merge between at least a first conduit fluidly connected to the first fluid transporting fractals and at least a second, conduit fluidly connect to the second fluid transporting fractals. The angle between the first conduit and second conduit can be any suitable angle. In embodiments, at least one first conduit merges with the at least one second conduit at an angle of between 0 to 180 degrees, preferably between 45 and 90 degrees. It should be appreciated that the two most commonly used angles are 90 and 45. However, there are variants, depending on the viscosity and surface tension of working fluids.

The ratio of the length to the diameter of the mixing streams channels in direct communication with the distribution zone is preferably at least 10, more preferably at least 15, even more preferably at least 20, yet even mare preferably at least 30 and most preferably at least 40 A larger the L/R promotes a more uniform flow of the fluids entering the mixing zone, which results in more efficient mixing within the mixing zone.

The ratio of the length to the diameter of the mixing zone channels is preferably at least 5, more preferably at least 10, even more preferably at least 15, yet even more preferably at least 20 and most preferably at least 30. A larger the L/R promotes the formation of Taylor flow within the mixing zone. Preferably, the L/R ratio is no more than 30, more preferably no more than 20 and even more preferably no more than 10. A lower L/R ratio reduces the uniformity of mixing and can, therefore, hinder the formation of Taylor flow in the mixing zone. Taylor flow regime is susceptible to external pressure and any variations due to the smaller L/R ratio leads to disturbances that are undesirable.

A number of factors can be varied in order to optimise Taylor flow in the mixing zone. For example, in the mixing zone, the capillary number between the two fluids is preferably between 0.001 to 0.2, preferably between 0.005 and 0.1 In the mixing zone, the Reynolds number is preferably from 10 to 1500, preferably 100 to 1000. In the mixing zone, the internal diameter of each conduit is preferably from 1 micron to 3 mm, preferably 5 microns to 2 mm, more preferably 10 microns to 1 mm.

In embodiments, the flow rate uniformity of the distribution zone channels entering the mixing zone is greater than 80%, preferably greater than 90%, more preferably greater than 95%. It should be appreciated that flow uniformity is defined as the standard deviation of the flow in all the outlets of the device. In ideal embodiments, flow uniformity of the mixed reactants entering the reaction zone is preferably 100% or about 100%.

A fifth aspect of the present invention provides a process for forming a Taylor flow in two fluids comprising feeding two or more fluid into the Taylor flow mixer according to the fourth aspect of the present invention.

In embodiments, the flow distribution system of the first aspect of the present invention can be utilised as part of a reactor system. A sixth aspect of the present invention provides a reactor for processing two or more fluid reactants comprising:

an inlet zone comprising two or more inlets for receiving each of the two or more reactants;
a distribution zone including a flow distribution system according to the first aspect of the present invention, the flow distribution system providing a plurality of distribution channels for distributing each reactant separately into successive channels of increasing cell density;
a mixing zone comprising a plurality of mixing channels for receiving and mixing the two or more reactants from the output of the distribution channels; and
a reaction zone comprising a plurality of reaction channels for reacting the two or more mixed reactants to thereby produce a product.

The reactor of this sixth aspect of the present invention enables yields and/or rates to be optimised through presenting a uniform flow of mixed reactants to the reaction zone. This is achieved through promoting uniform flow of the reactants entering the mixing zone, resulting in reduced variations in co-reaction of the reactants and thus reduced a temperature variation of the reactants entering the reaction zone.

The reactants are maintained apart until the mixing zone wherein small volumes of the reactants are combined. The combination of the small volumes of the mixed reactants combined with their high flow velocities reduces the probability and impact of flashback events.

In one embodiment, the reaction zone is also the mixing zone. Although a discrete mixing zone is typically preferred as it promotes high mixing efficiency of the stream entering the reaction zone.

The mixing zone preferably comprises one or more baffles. The baffles promote radial mixing of the reactants.

The distribution channel diameter immediate adjacent the mixing channel is preferably between 0.01 and 100 mm, more preferably between 0.1 and 10 mm and even more preferably between 0.5 and 5 mm. The thickness of the channel walls are preferably between 0.3 and 3 mm.

The ratio of the length to the diameter of the reactant streams channels in direct communication with the mixing zone is preferably at least 10, more preferably at least 15, even more preferably at least 20, yet even more preferably at least 30 and most preferably at least 40. A larger the L/R promotes a more uniform flow of the reactants entering the mixing zone, which results in more efficient mixing within the mixing zone.

The ratio of the length to the diameter of the mixing zone channels is preferably at least 5, more preferably at least 10, even more preferably at least 15, yet even more preferably at least 20 and most preferably at least 30. A larger the L/R promotes higher mixing efficiencies of the reactants exiting the mixing zone. Preferably, the L/R ratio is no more than 30, more preferably no more than 20 and even more preferably no more than 10. A lower L/R ratio reduces the mean residence time of the combined reactants and thus reduces non-catalysed reactions prior to entering the reaction zone. This if particular benefit in the prevention of flash back for systems for which one fuel is an oxidant and the other a combustible fluid. In a flash back situation a flame front travels in the reverse direction of fluid flow, ultimately terminating at the point of mixing. By blending close to the point of reaction the effect of a flashback will be reduced.

The mixing efficiency of the mixing zone is preferably 100% or about 100%. embodiments, the mixing efficiency of the mixing zone is at least 80%, more preferably at least 90% and even more preferably at least 95%. It should be appreciated that Mixing efficiency is defined as the measurement of the relative standard deviation M:

$$M = \frac{S}{\bar{c}} \times 100$$

Where s=standard deviation of concentration distribution and $\bar{c}$=average concentration of the mixture.

The flow uniformity of the mixed reactants entering the reaction zone is preferably at least 80%, more preferably at least 90% and even more preferably at least 95%. It should be appreciated that flow uniformity is defined as the standard deviation of the flow in all the outlets of the device. In ideal embodiments, flow uniformity of the mixed reactants entering the reaction zone is preferably 100% or about 100%.

Preferably, each mixing channel communicates with no more than 4, more preferably no more than 3, and even more preferably no more than 2 reactor channels. By limiting the dispersion of the reactants into the reaction zone, a uniform flow regime is promoted.

The reaction, mixing and distribution zones are preferably part of a monolithic construction. In some embodiments, the reaction zone and\or the mixing zone comprises a heat exchanger to control the temperature of the mixing and/or reaction zones. The heat exchanger preferably comprises a plurality of heat exchange channels, adjacent to the mixing or reaction channels, for a heat exchange fluid to flow there through.

The reaction channels preferably comprise a catalyst. The catalyst may form part of a fixed catalyst bed within the reactor channels. Alternatively, the catalyst may be coated on the reactor channel wall. Preferably, the Reynold's number of each of the reactants is no more than 50,000.

In a seventh aspect of the present invention, there is provided a process for reacting two or more fluid reactants comprising feeding the two or more fluid reactants into the reactor according to any one of the embodiments of the sixth aspect of the present invention.

The velocity of the reactants entering the mixing zone is preferably between 0.01 and 10 metres/second, more preferably between 0.1 and 5 metres/second and even more preferably between 0.5 and 2 metres/second.

Preferably, the fluid reactant is a gaseous or liquid reactant or combination thereof. In a preferred embodiment, a reactant comprises a hydrocarbon with carbon chain length of less than 8, more preferably less than 6, even more preferably less than 4 and even more preferably less than 2.

In an eighth aspect of the present invention, there is provided use of the reactor according to any one of the embodiments of the sixth aspect of the present invention to react two or more reactants. Preferably the reactor is used for the reforming of natural gas or methane.

In one embodiment, the reactants compromise methane and oxygen (or air) and the reaction is catalytic partial oxidation.

In an alternative embodiment, the reactor comprising a reaction zone for an exothermic reaction intersperse with a reaction zone for an endothermic reaction. One example of this embodiment is the dual reforming of methane or natural gas. The channels within the reactor may be appropriately configured such that the heat generated from the exothermic catalytic partial oxidation reaction drives the endothermic steam methane reforming reaction (i.e. the reaction channels being adjacent to each other).

It should be appreciated that the flow distributor of the present invention can be used as a flow splitter or divider or in reverse as a flow merge device. For example, in one application the flow splitter can be used to separate two portions of an emulsion.

It should be appreciated that the flow distribution system of the present invention can be utilised in a number of industries in the analytical, water purification, pharmaceutical, oil and gas, food, explosives, or automotive industry. Applications in the various industries include (but are not limited to) water analysis, Liquid-Liquid extraction, Gas-liquid reactors, Gas-liquid-solid reactors, Refiners such as SOR, Colloid Production, POX, Catalytic ATR, Catalytic converter, SCR, Separations, Reactors, Bubble columns, Fluidized bed reactors, Trickle bed reactors, Heat exchangers, Intensified Reactor separators, Multiphase reactors/separators. It should also be appreciated that the flow distribution system of the present invention can be utilised in mixing fuels for example in burners, lances or the like and in blending fluids such as fluid mixers and blenders.

BRIEF DESCRIPTION OF THE DRAWINGS

The present invention will now be described with reference to the figures of the accompanying drawings, which illustrate particular preferred embodiments of the present invention, wherein.

$$\delta = -\frac{\log(U)}{\log(\sigma)} = -\frac{\log(4)}{\log(1/3)} = 1.26 \qquad (i)$$

$$\delta = -\frac{\log(U)}{\log(1/2)} = 2 \qquad (ii)$$

$$\delta = -\frac{\log(U)}{\log(2/3)} = 3.42 \qquad (iii)$$

Note the low space-filling capacity in case (i) and the overlapping interference in case (iii).

Figure 2:
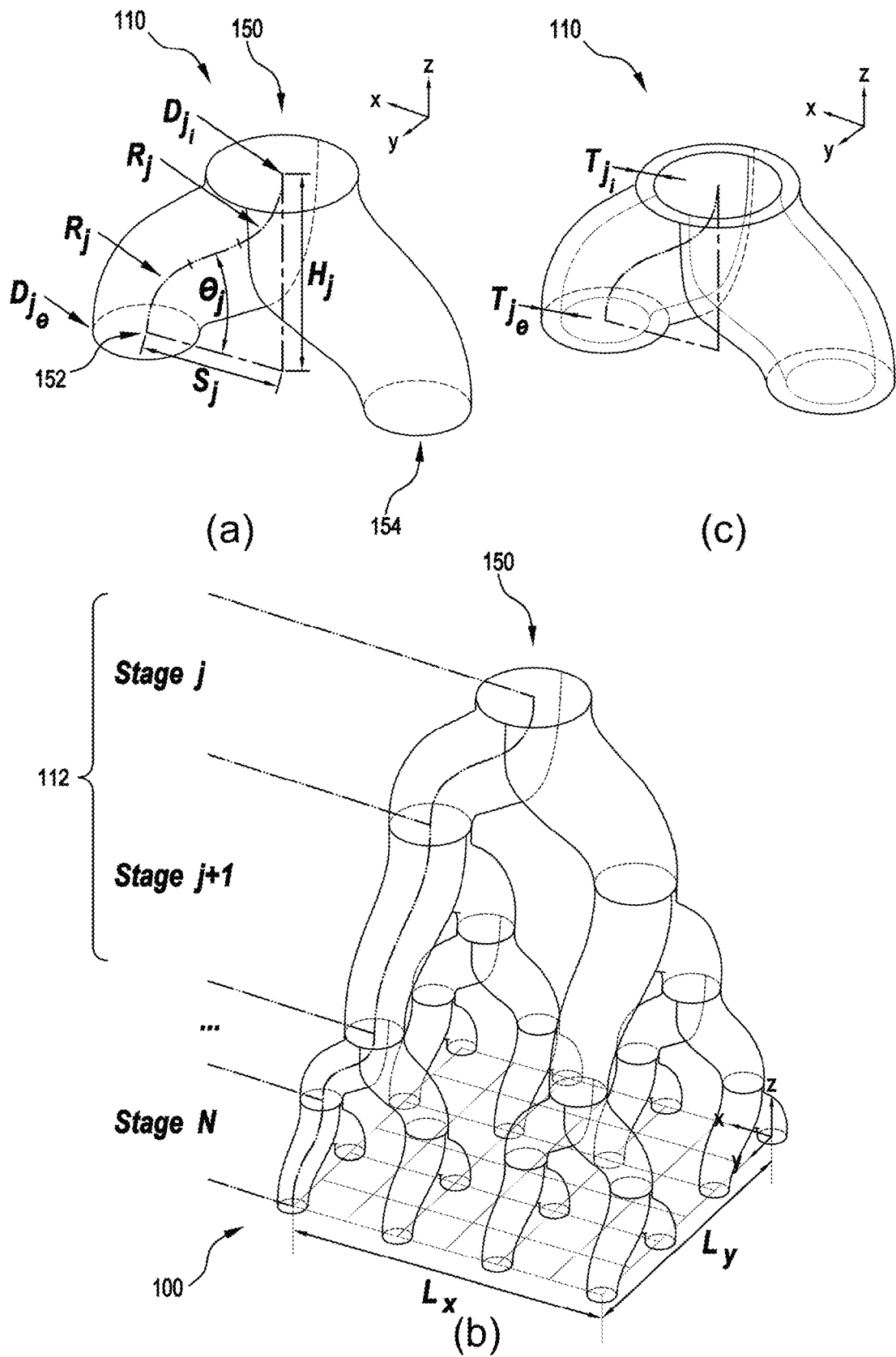
FIG. 2 illustrates an embodiment of flow distribution system according to the present invention showing (a) Single bifurcation unit with key dimensions; (b) A four stage (N=4) embodiment. Fractal self-similar repeating unit of detail comprising of j and j+1 units shaded) identified by "H" shaped lines on projected two-dimensional unit connectivity schematic; and (c) a single bifurcation unit of an embodiment of flow distribution system according to the present invention showing wall thickness dimensions.
Figure 2A:
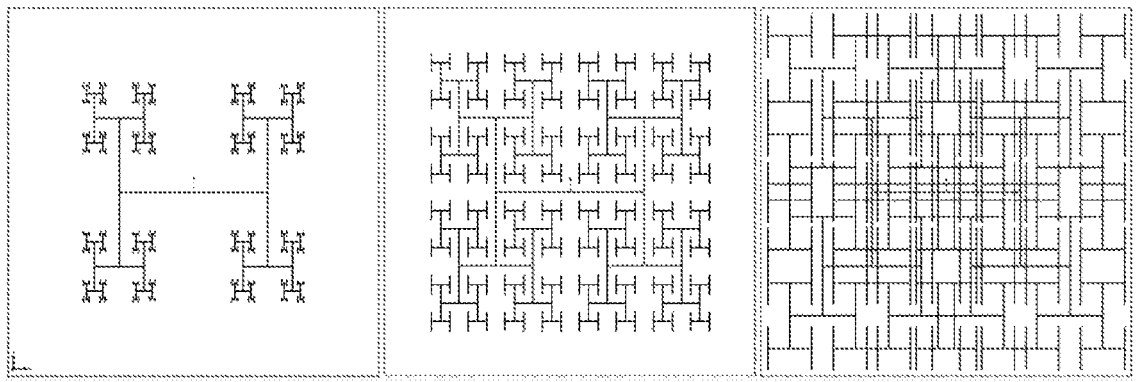
FIG. 2A illustrates fractal flow distributor space filling characteristics with changing fractal dimension for a square aspect ratio. Repeating unit of detail identified by "H" shaped lines. In the figures, δ comprises.
Figure 2B:
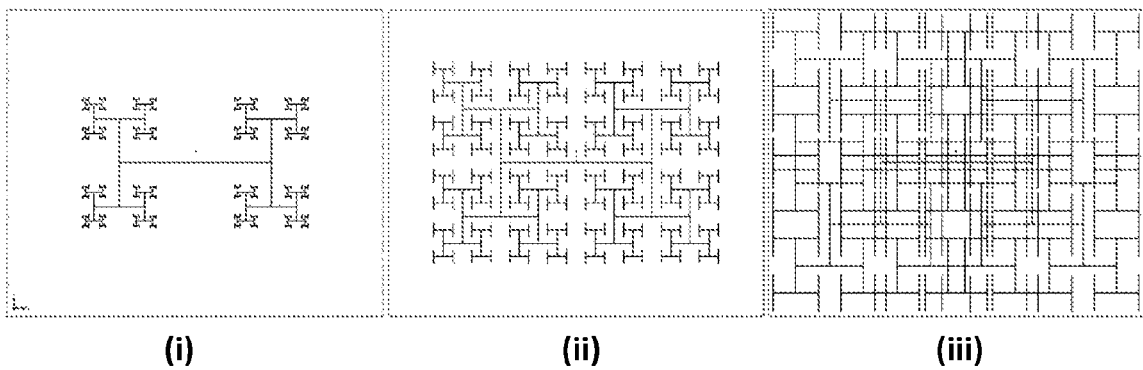

FIG. 2B illustrates fractal flow distributor space filling characteristics with changing fractal dimension for a rectangular aspect ratio. Repeating unit of detail identified by "H" shaped lines. In the figures:

$$\delta = -\frac{\log(U)}{\log(\sigma)} = -\frac{\log(4)}{\log\left(\left(\sqrt{3}/3\right)^2\right)} = 1.26 \qquad (i)$$

$$\delta = -\frac{\log(4)}{\log\left(\left(\sqrt{2}/2\right)^2\right)} = 2 \qquad (ii)$$

$$\delta = -\frac{\log(4)}{\log\left(\left(\sqrt{2}/3\right)^2\right)} = 3.42 \qquad (iii)$$

Note the low space-filling capacity in case (i) and the overlapping interference in case (iii).

Figure 3:
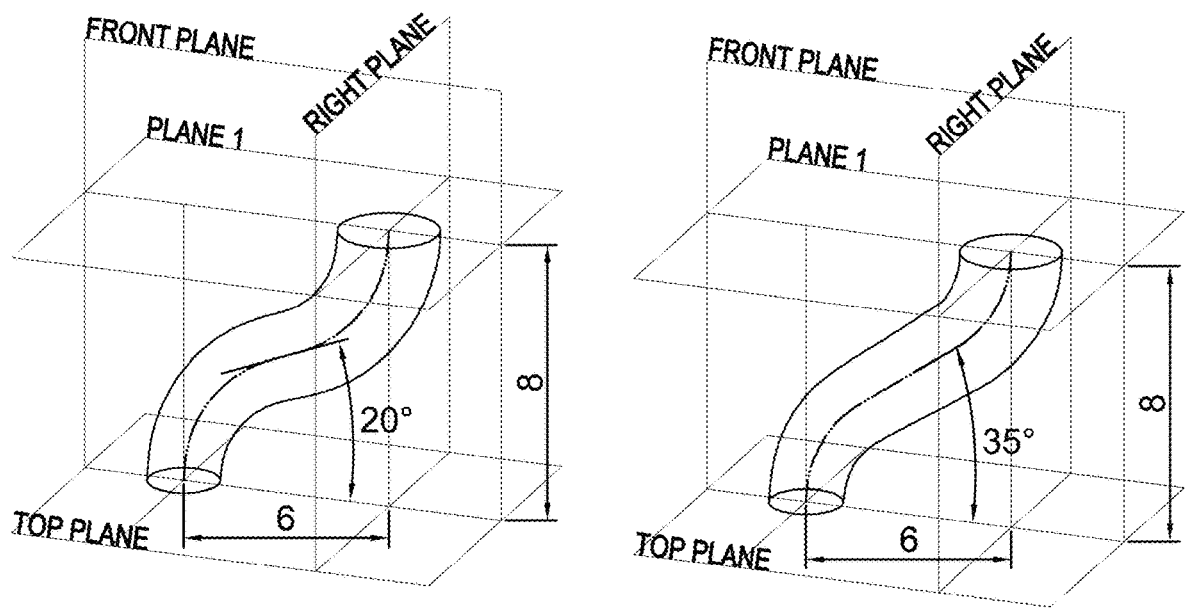
Figure 3:
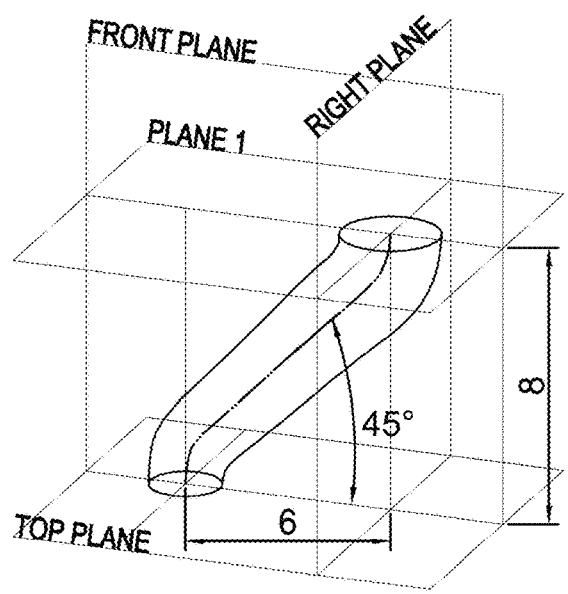

FIG. 3 show three different channels of a bifurcation unit from a fluid transporting fractal constructed with different values of $\theta_j$; being (a) $\theta_j$=20 degrees; (b) $\theta_j$=35 degrees; and (c) $\theta_j$=45 degrees.

Figure 4:
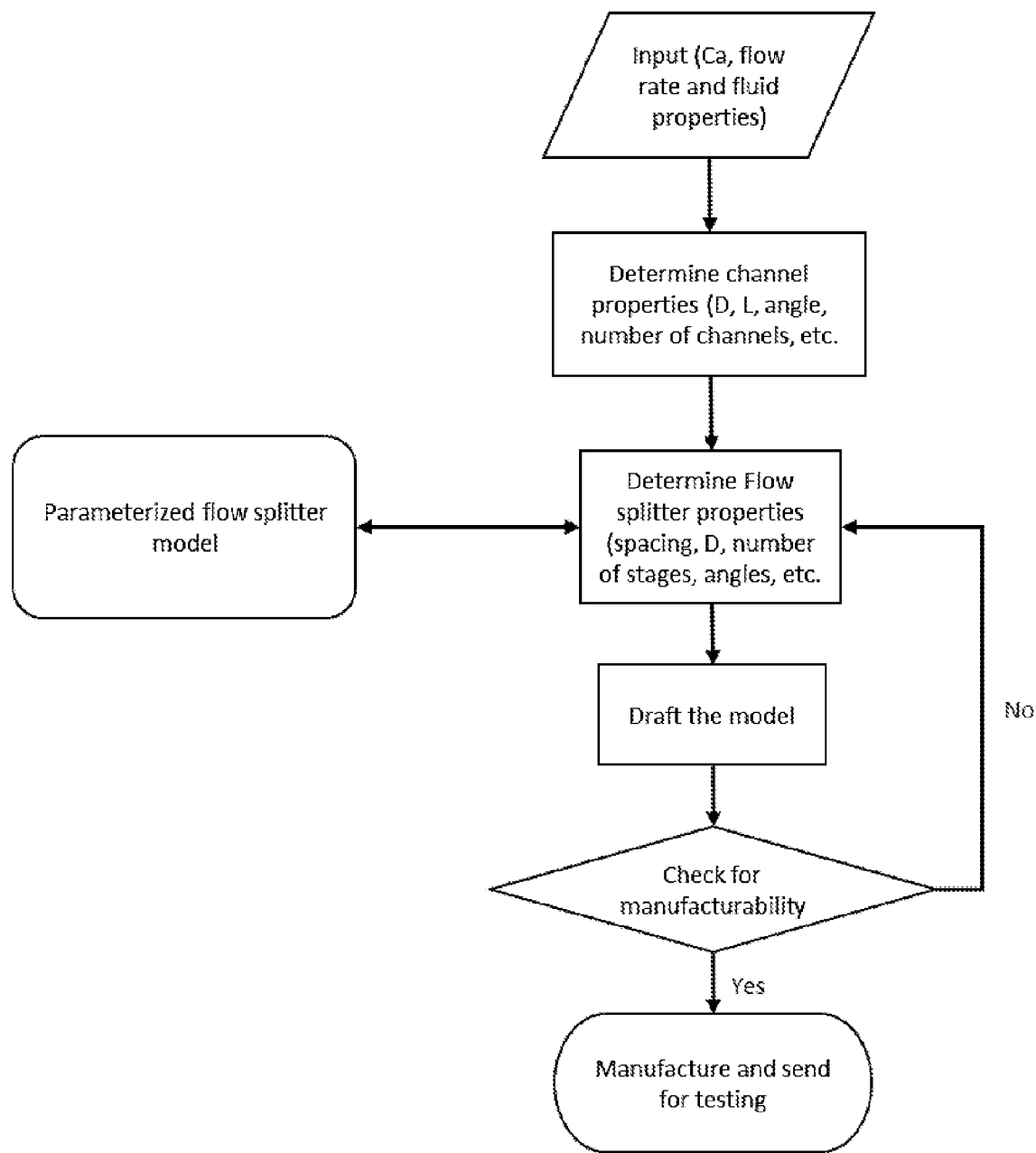

FIG. 4 illustrates the steps in the design methodology to develop the flow distribution system according to the present invention.

Figure 5:
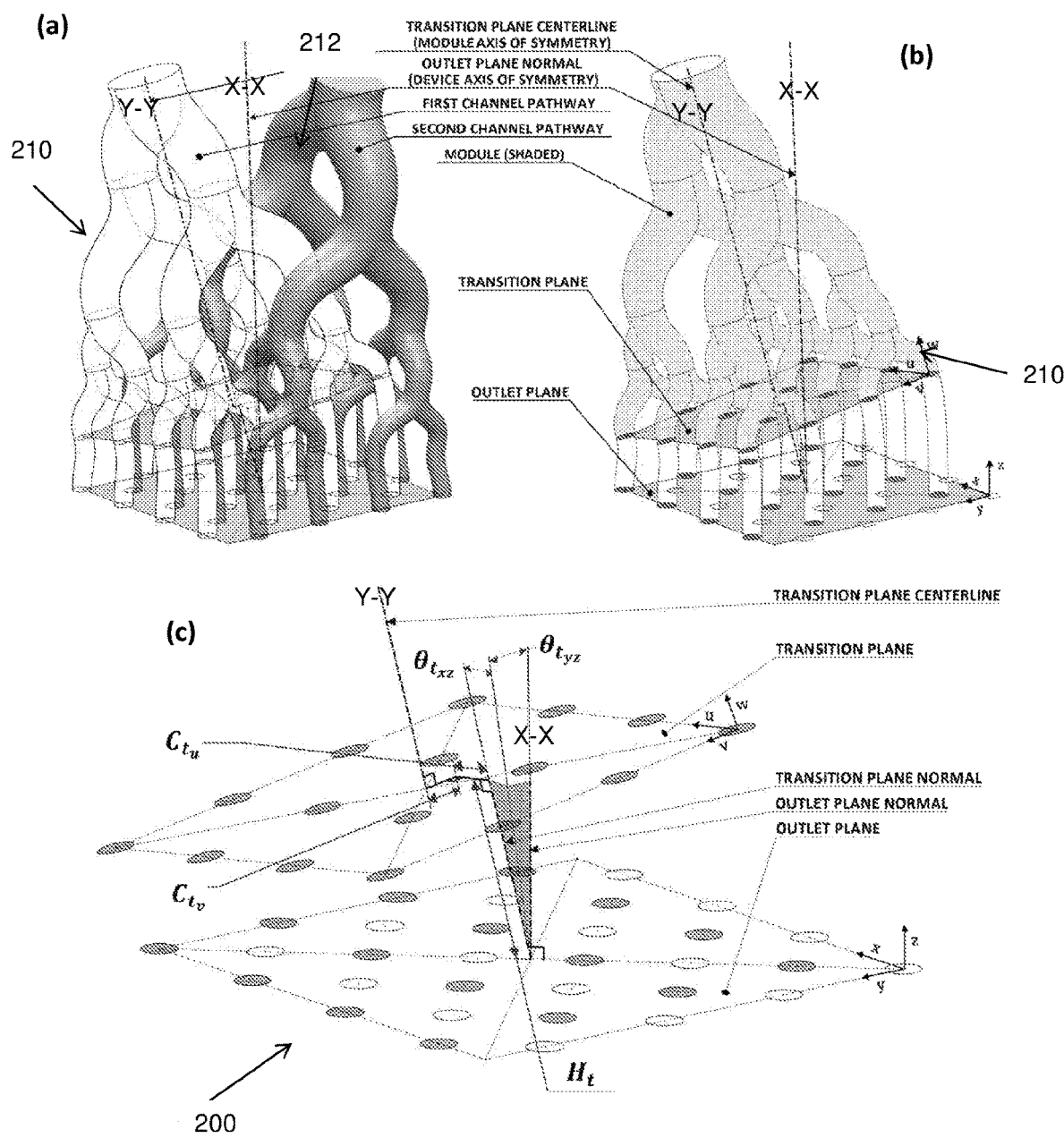

FIG. 5 provides a schematic figures showing an embodiment of the flow distribution system of the present invention with fluid transporting fractals (two independent channel pathways), illustrating: (a) Nesting arrangement of two channel pathways and associated pathway and device axes of symmetry; (b) Single channel pathway indicating arrangement of inclined transition plane and outlet plane; and (c) Detailed view of nesting parameters defining orientation of channel pathway relative to device outlet plane and channel pathway transition plane.

Figure 6:
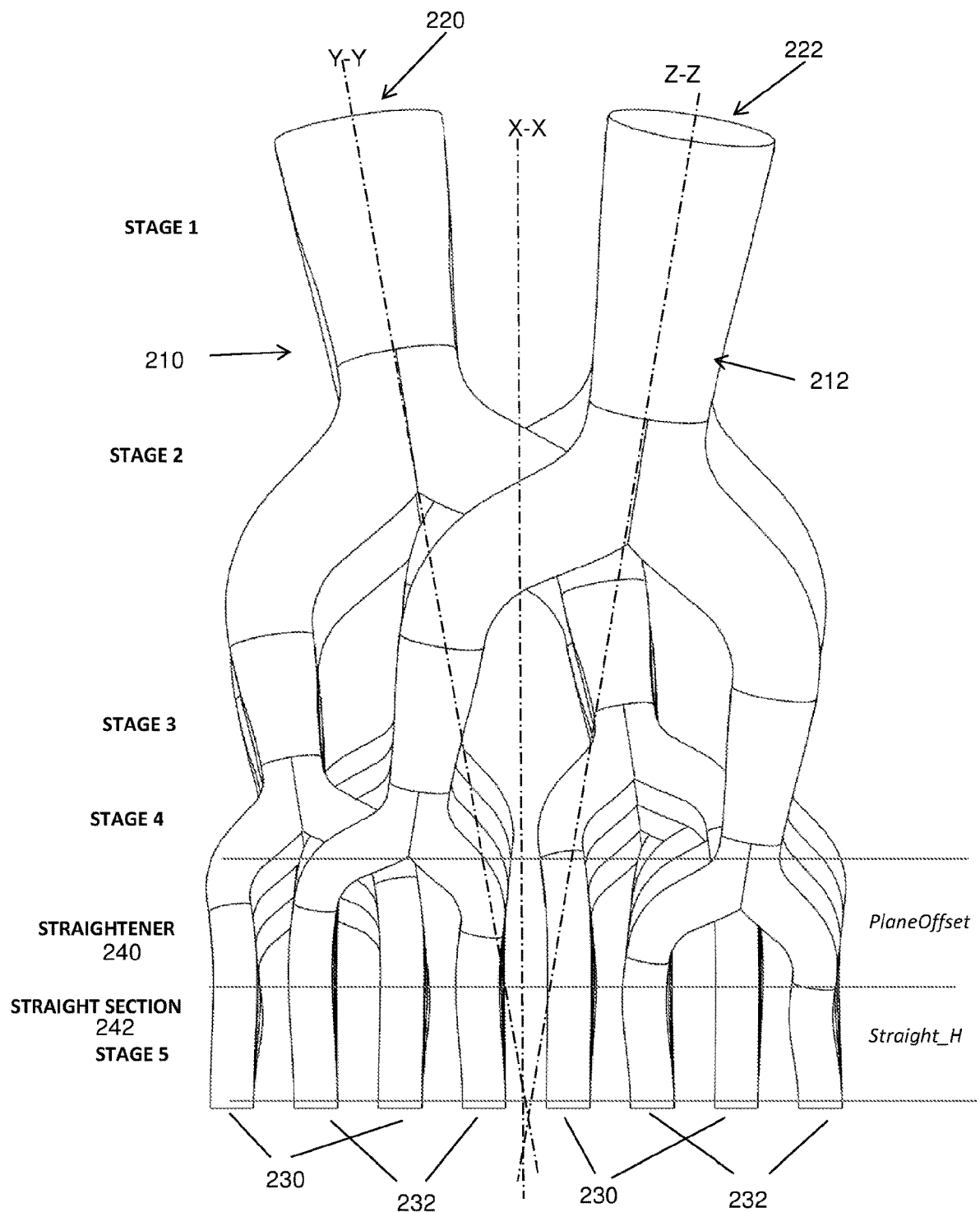

FIG. 6 provides a front view of a flow distribution system according to an embodiment of the present invention that includes two nested fluid transporting fractals.

Figure 7:
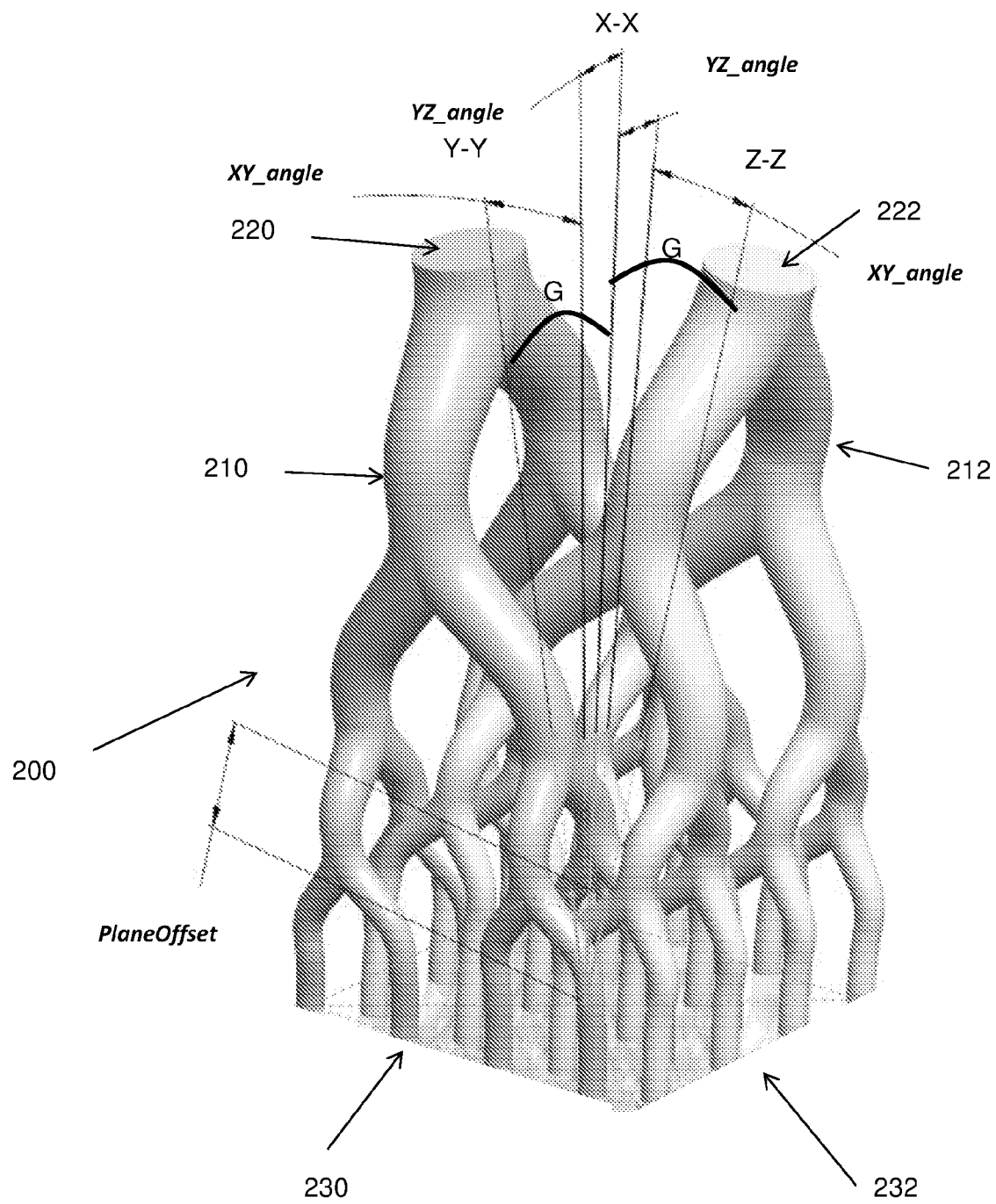

FIG. 7 provides an isometric view of the flow distribution system of FIG. 6 which forms a feeder for a mixer illustrating the plane offset between the fluid flow distribution systems.

Figure 8:
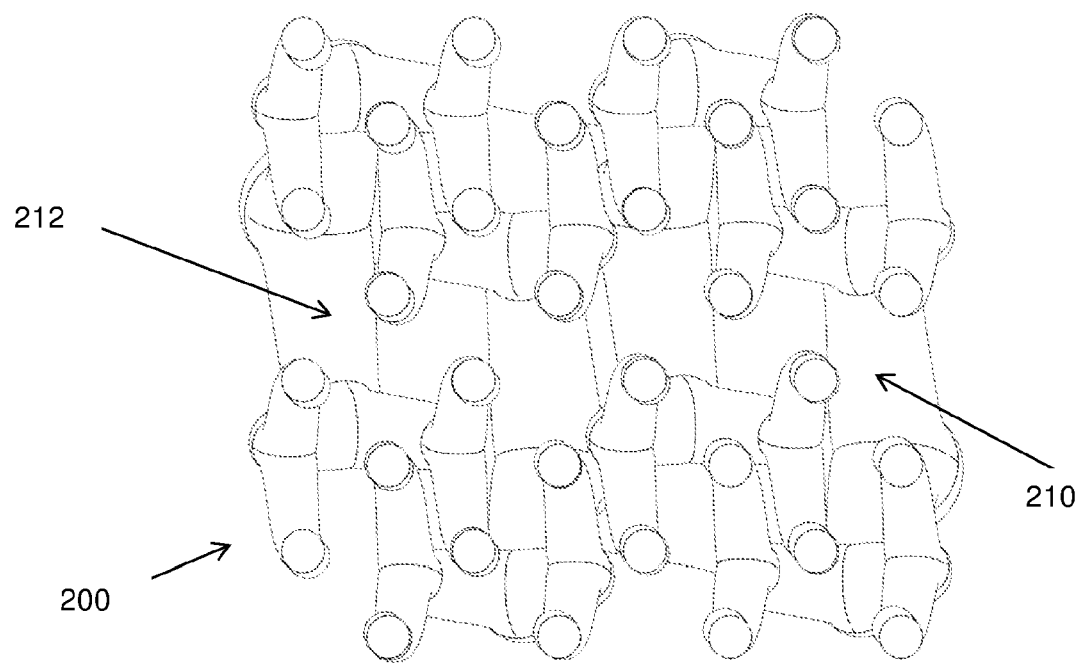

FIG. 8 provides a bottom view of flow distribution system shown in FIG. 7.

Figure 9:
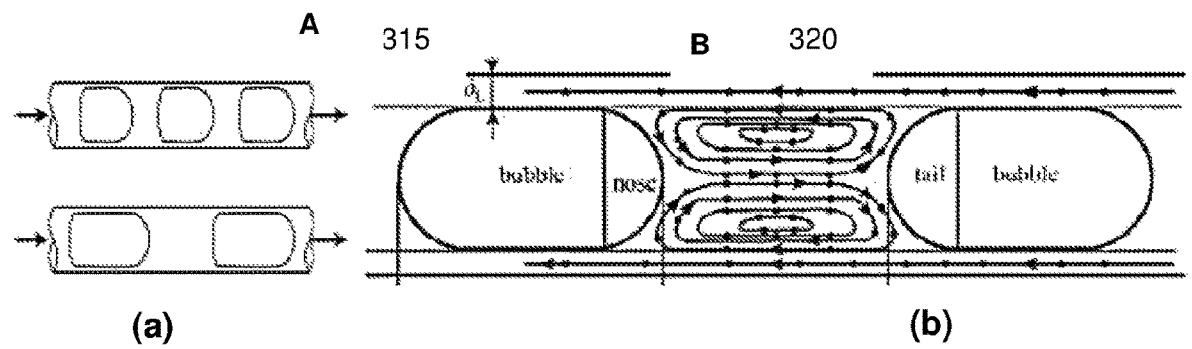

FIG. 9 provides an illustrated schematic of Taylor flow in a conduit.

Figure 10:
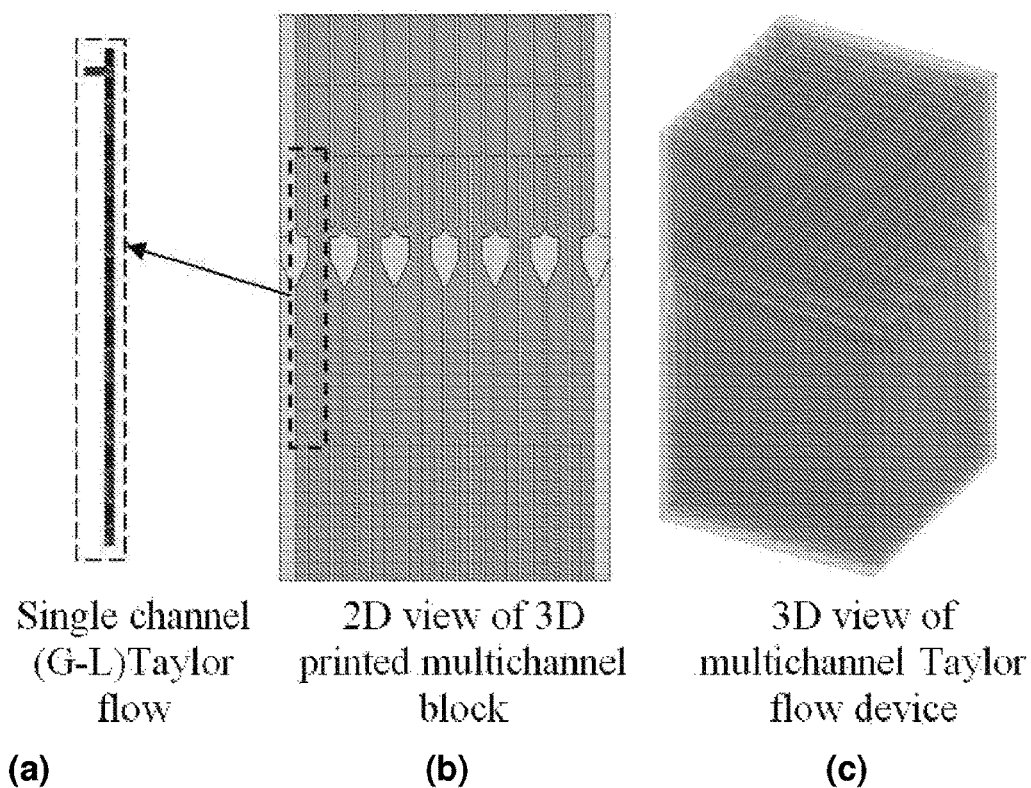

FIG. 10 provides illustrations schematically showing numbering up of parallel Taylor flow channels.

Figure 11:
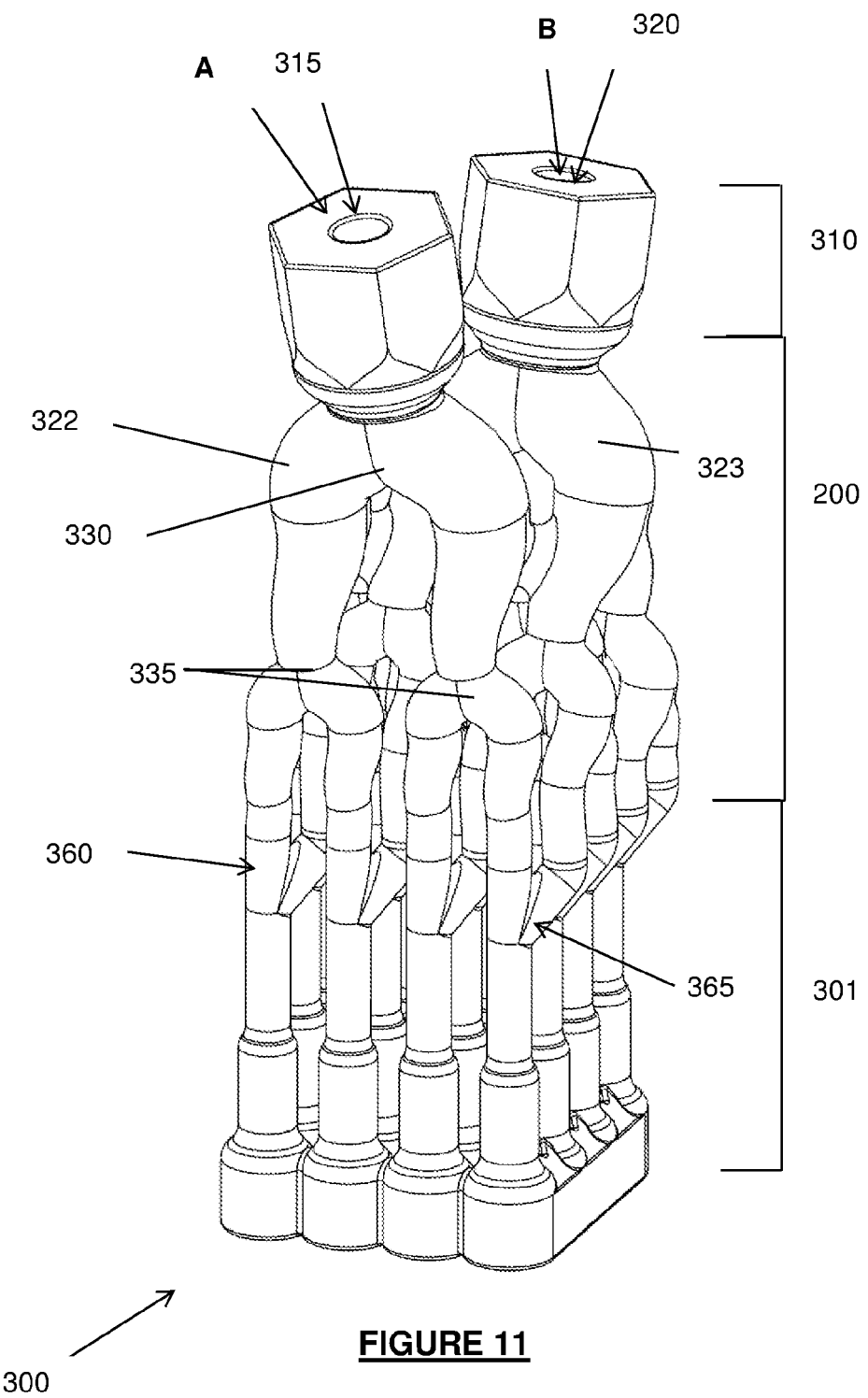

FIG. 11 is an isometric view of a Taylor flow mixing device according to one embodiment of the present invention.

Figure 12A:
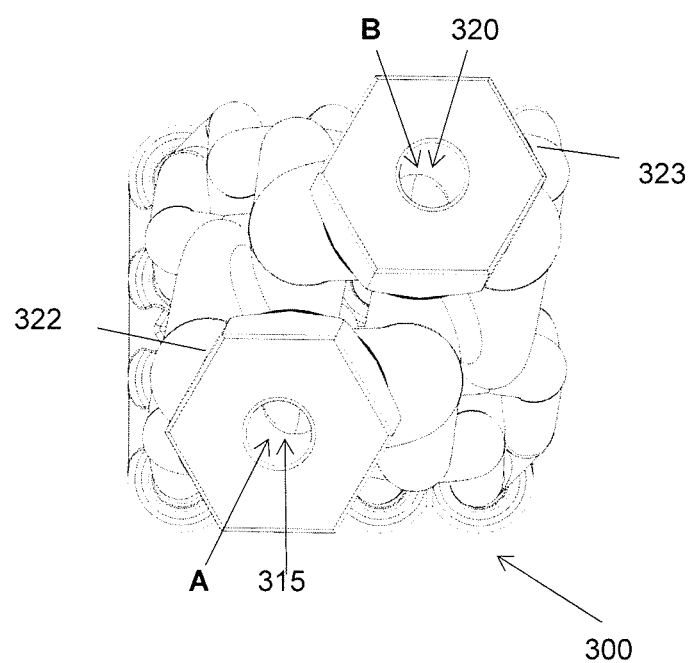
Figure 12:
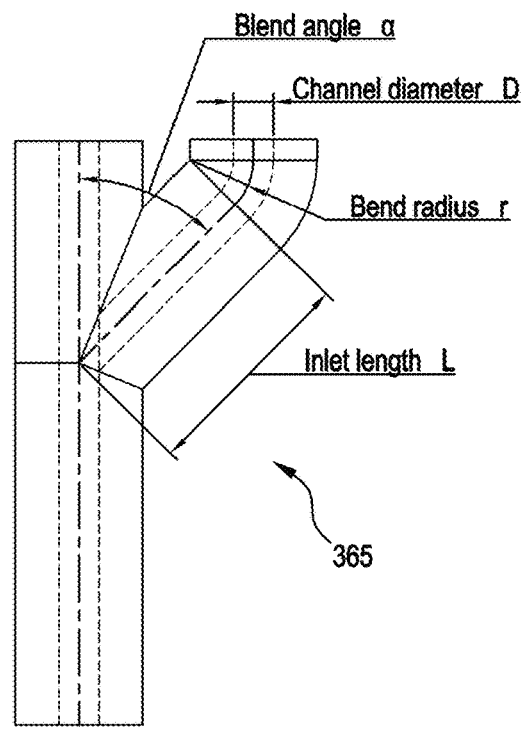
Figure 12C:
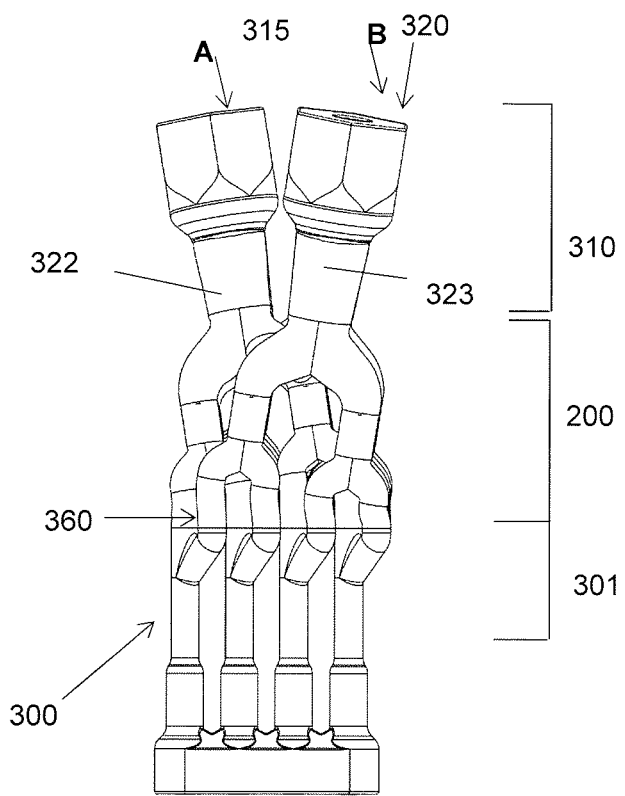
Figure 12D:
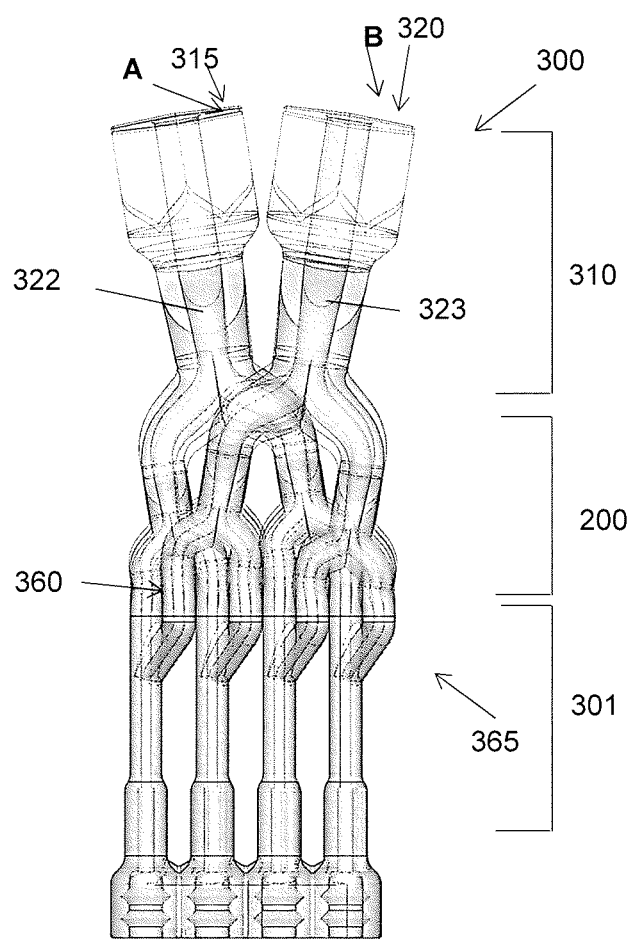

FIG. 12 provides various views of the Taylor flow mixing device shown in FIG. 11, showing (a) a top view; (b) close up of the outlet from the flow distribution system stage; (c) side view showing the merge and mixing stage; and (d) a cross-sectional side view showing the internal flow paths.

Figure 13:
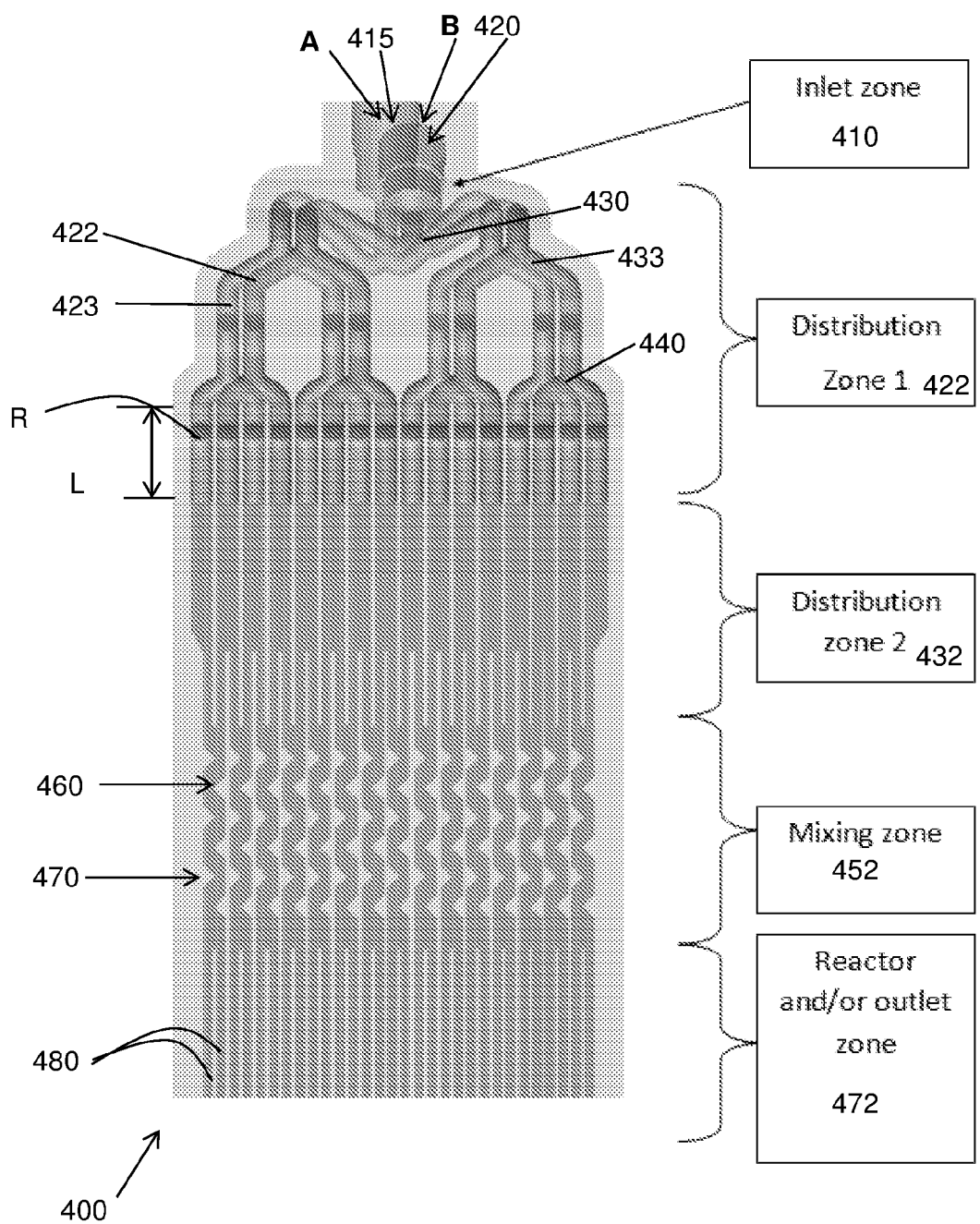

FIG. 13 is a schematic diagram of a reactor according to one embodiment of the present invention.

Figure 14:
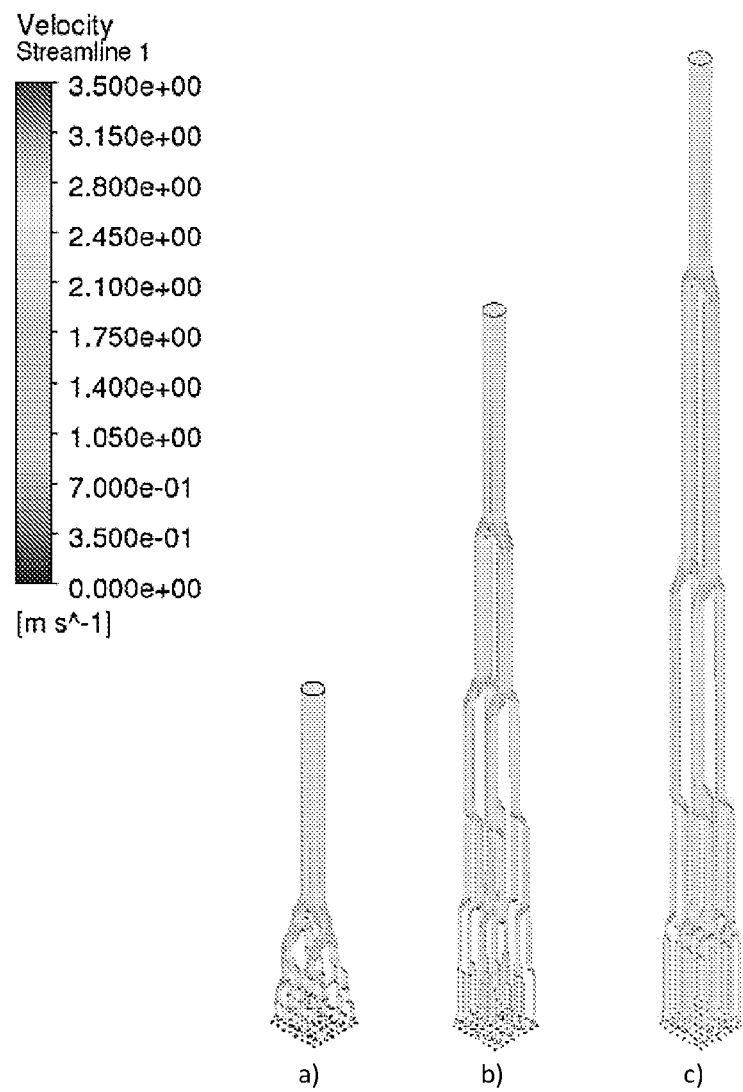

FIG. 14 shows the predicted gas streamlines for flow distribution system with different transition channel length. a) L/D=0; b) L/D=10; c) L/D=20.

Figure 15:
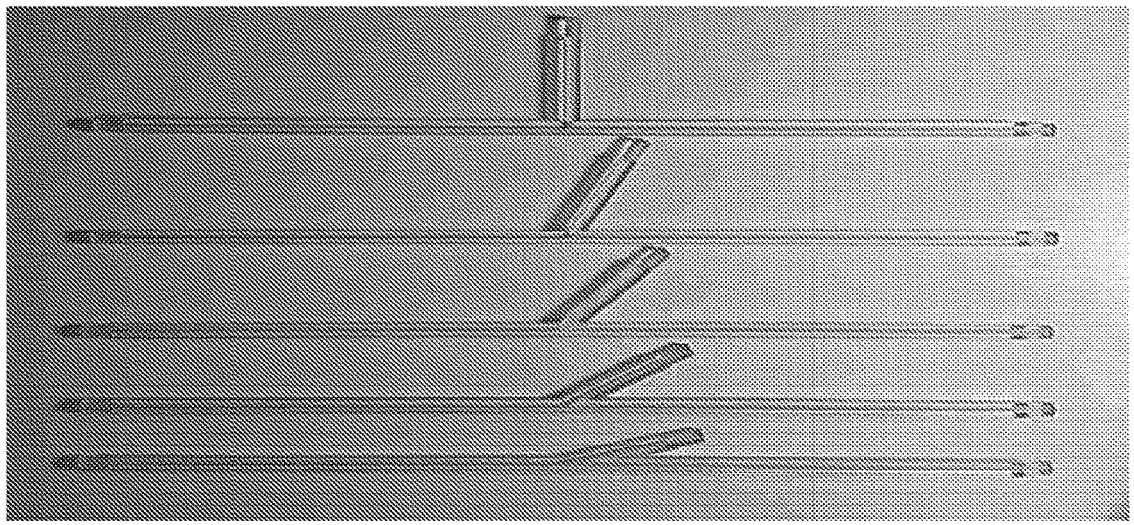
Figure 15:
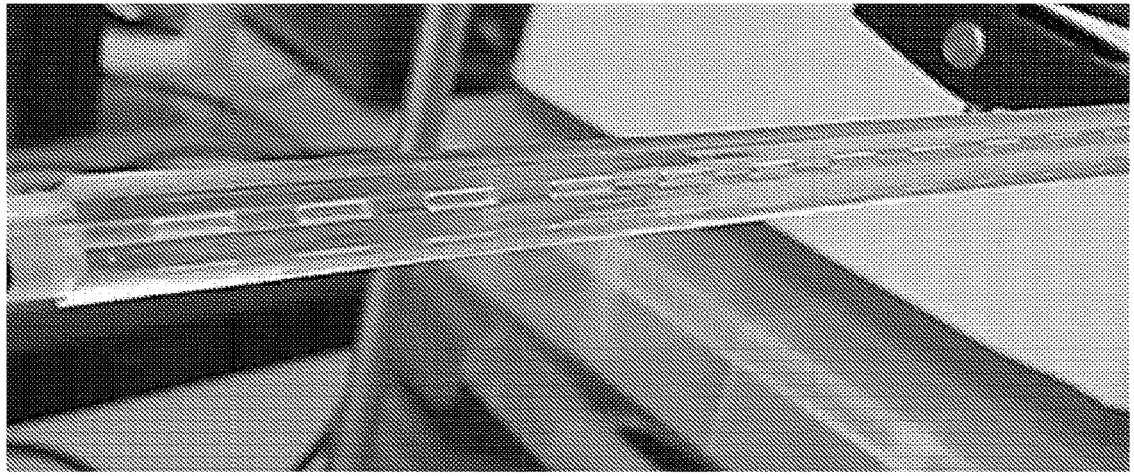
Figure 15:
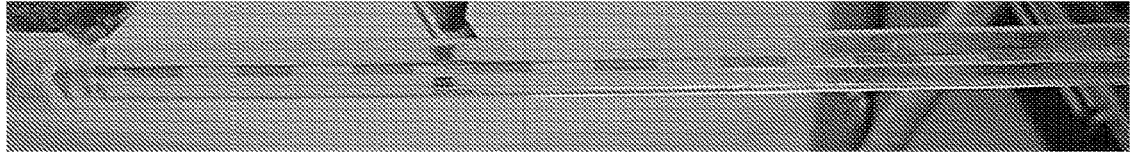

FIG. 15 provides a photograph showing: (a) the various flow merge configurations of a mixing section used to develop Taylor flow; (b) a photograph of Taylor flow developed in one of the mixing sections shown in (a). (c) a photograph of Taylor flow developed in one of the mixing sections shown in (a). (d) a photograph of Taylor flow developed from one of the mixing sections shown in (a).

Figure 16:
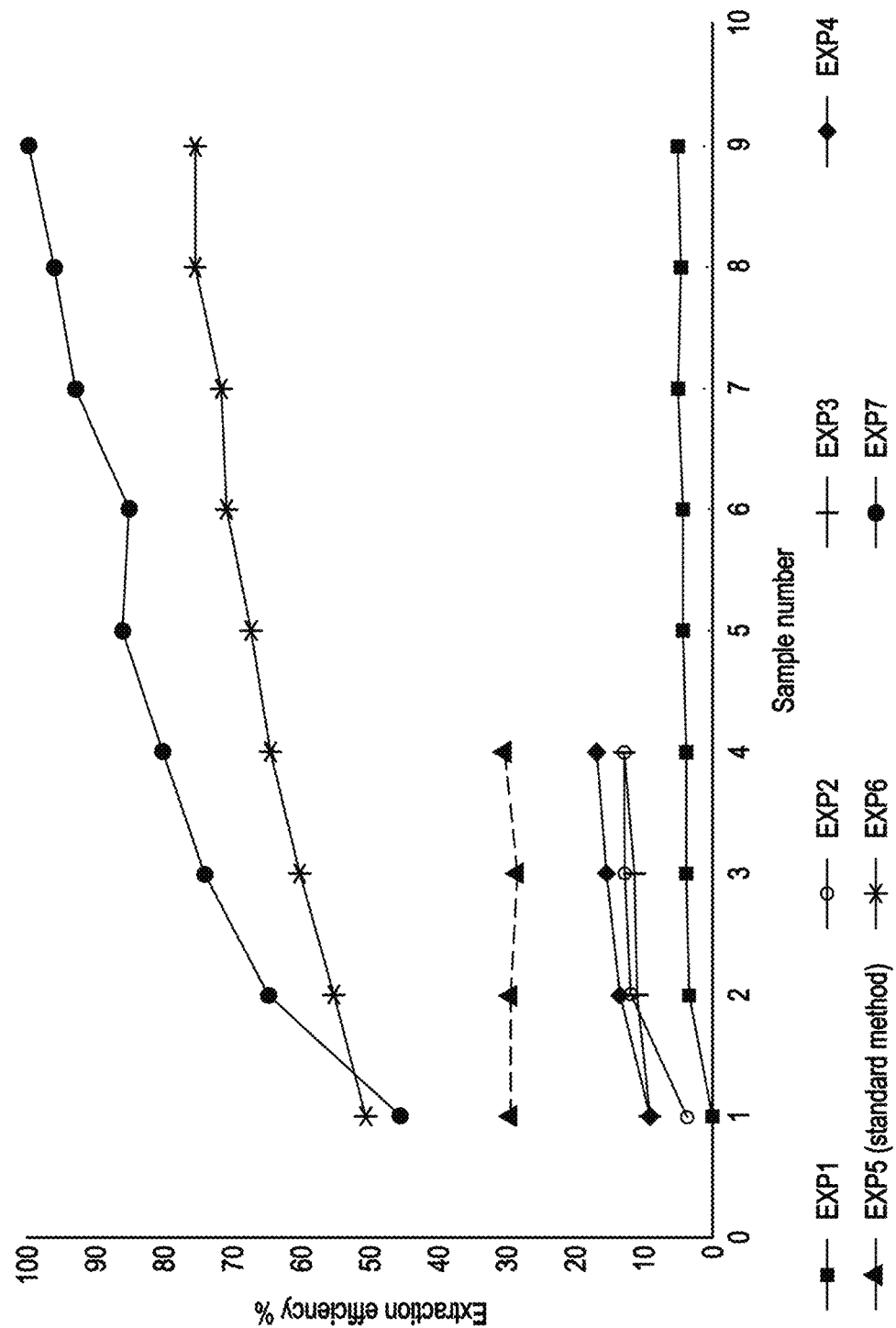

FIG. 16 provides a plot illustrating the extraction efficiencies for varying flow rates and time for Liquid-Liquid extraction using a Taylor flow device according to the present invention.

Figure 17:
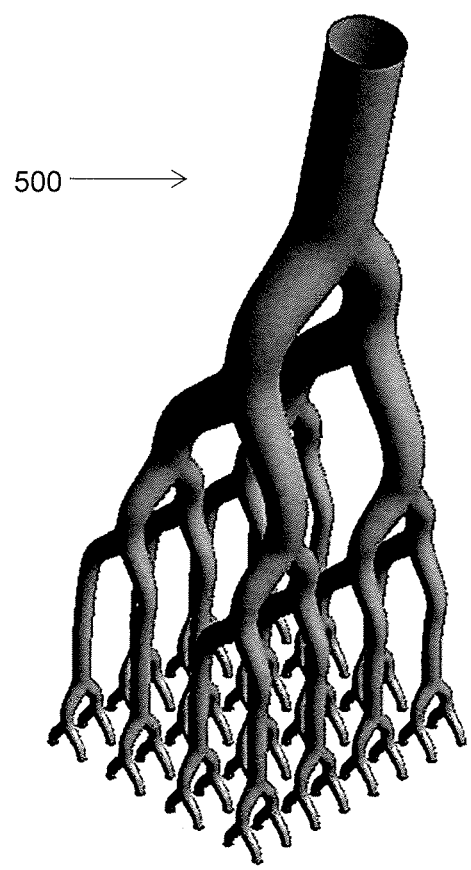

FIG. 17 provides a schematic of a modelled flow distribution system according to one embodiment of the present invention used for the experimental validation test runs.

Figure 18:
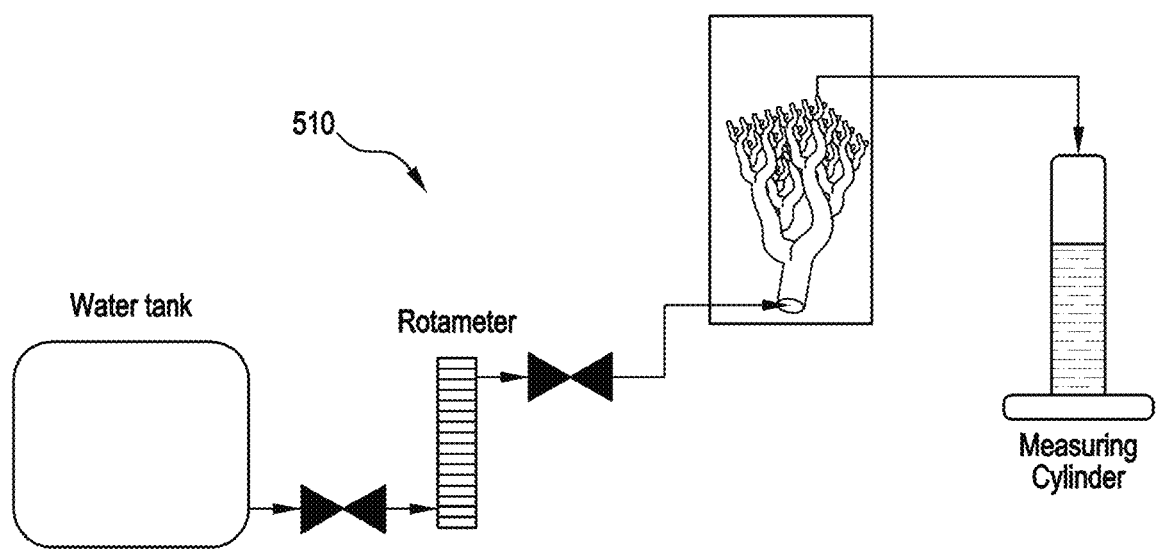

FIG. 18 provides a photograph of the experimental validation set up for the measurement of flow rate from each channel of the multi-channel flow distribution device shown in FIG. 17.

Figure 19:
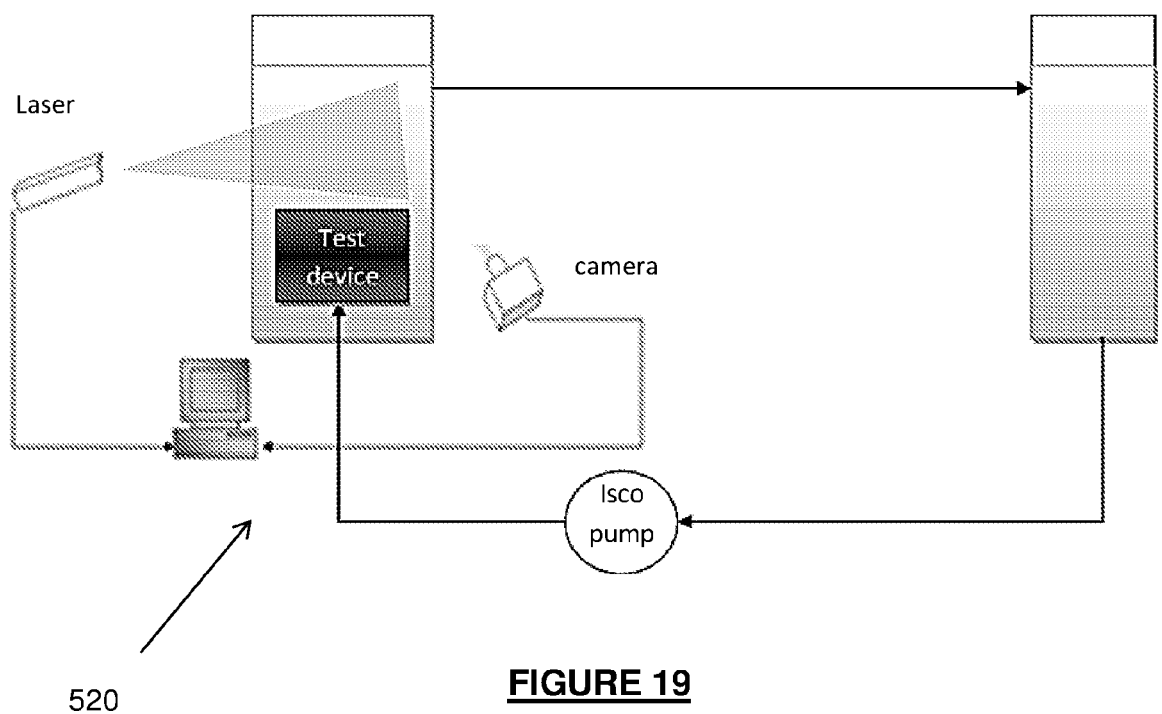

FIG. 19 provides a schematic of the particle Image Velocimetry (PIV) experimental set up to validate a CFD model of the flow distribution system shown in FIG. 17.

Figure 20:
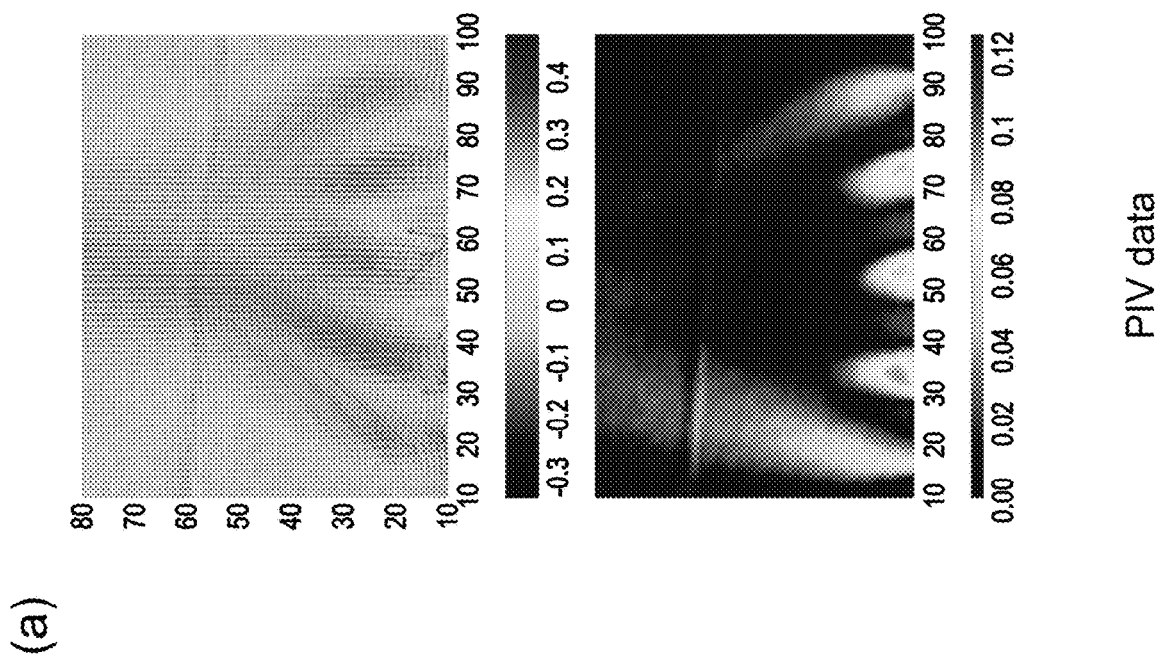
Figure 20:
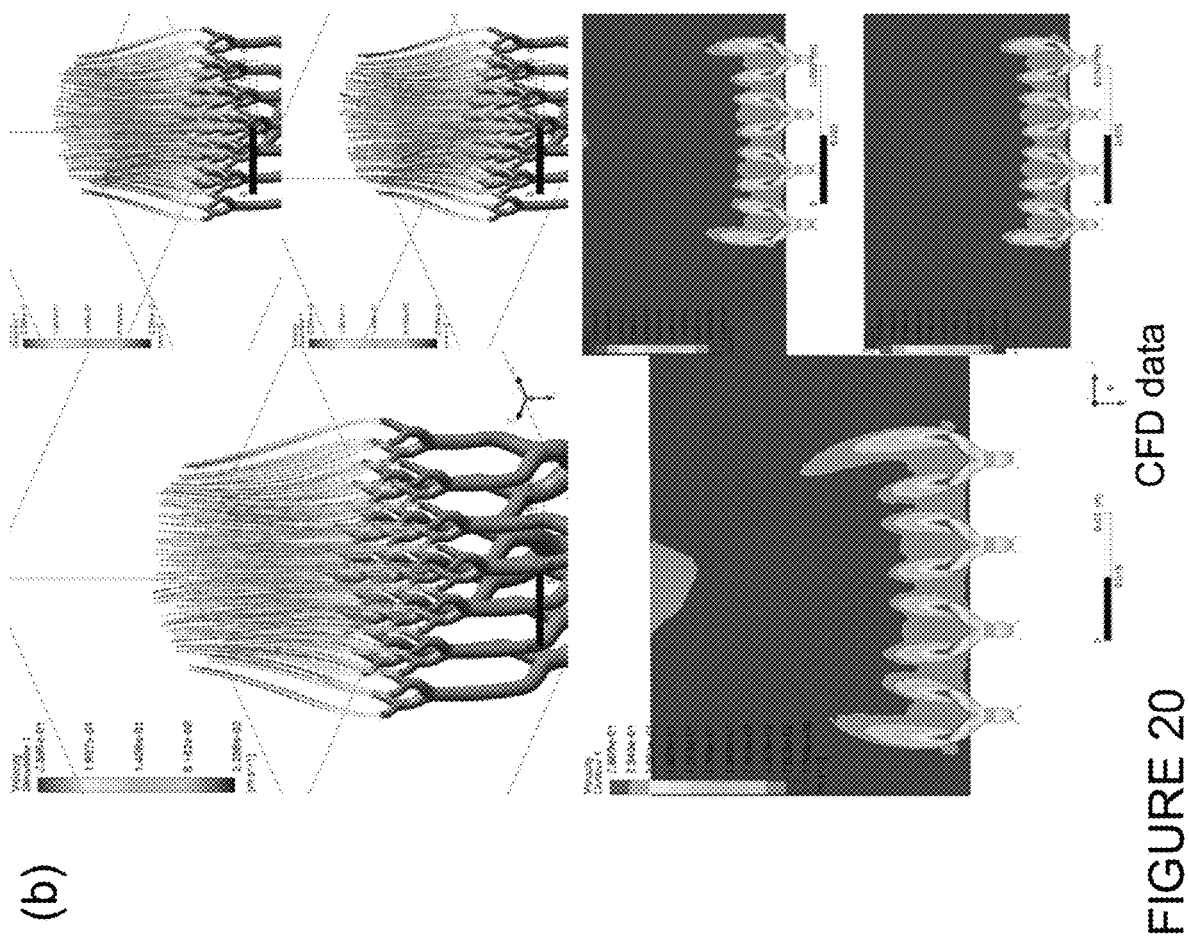

FIG. 20 provides velocity contours of PIV and CFD data of the flow distribution system shown in FIG. 17 obtained from a submerged tank.

DETAILED DESCRIPTION

The present invention provides a new fluid flow distribution system which combines two parallel sequential flow division schemes to achieve high outlet flow uniformity and packing density.

A high-performance flow distribution system is ideally designed to distribute the desired volume flow rate over a required area or volume and aim to minimise the following objectives:

Variation in flow rates between outlet channels. High variation across distributor outlets can lead to inefficiencies and reduced control in the downstream process. For example, variation in the flow rates at the inlet channels to a downstream monolith catalyst support device can result in mal-distribution of catalyst utilisation.

Pressure loss across the device. Loss of pressure in channel flow is caused by frictional dissipation due to viscous fluid shear stresses and is influenced by; channel diameter, length, flow rate, surface roughness, and geometric transitions in fluid path or cross-sectional flow area. The resultant losses translate to economic costs due to a required compensating increase in pumping power.

Device fluid volume. A direct benefit of minimising fluid volume is the associated reduction of device volume; this translates to lower material use in manufacturing and required device installation space. Additional benefits include reduced fluid volume for device priming leading to smaller losses when changing fluids, as well as shorter fluid priming and transition times.

Design and manufacturing complexity. Lower design and manufacturing requirements directly translate to cost reduction.

However, some of the above can be competing objectives and require compromise for the intended application. For example, pressure loss due to frictional dissipation can be reduced by increasing channel diameter. However, this will also increase the device fluid volume. This compromise may be necessary in an application where pressure loss reduction is of high importance, therefore warranting a larger device volume.

Depending on the application, additional characteristics of importance for fluid distributor design may also include: operational turn-down ratio, achievable outlet channel density, ability to accommodate multiple streams, as well as disassembly allowing internal device access for maintenance or application of functional coatings and materials. Similarly, the proportions of the flow distribution device may also be of importance; for example, when a layout of multiple distribution units is required for process scale up, it is desirable that the proportions are distributed within the device outlet footprint so that units may be adjoined without significant gaps.

With the above considerations in mind, the flow distribution system of the present invention has been designed as a sequential flow distribution where flow division occurs over at least two stages, through a structured array of sequential bifurcations (for example, FIG. 1(b)). The sequential approach provides an inherently high level of control over flow trajectory, assisting flow equidistribution.

Evolved natural flow distribution systems, such as cardiovascular networks or bronchial trees, tend to be sequential embodiments, with common characteristics such as recursive bifurcation, space-filling, and self-similar geometry—characteristics typically inherent of fractal geometry. For example, Murray (C. D. Murray, "The physiological principle of minimum work I. The vascular system and the cost of blood volume," *Proc. Natl. Mad. Sci.*, vol. 12, no. 3, pp. 207-214, 1926, the contents of which should be understood to be incorporated into this specification by this reference) derived the principle of minimum work which models the diameter ratio of bifurcating cardiovascular networks, by posting the underlying evolutionary objective to be the concurrent minimisation of: work associated with pumping of blood (due to frictional viscous dissipation and pressure loss); and, the metabolic costs of maintaining blood volume. From Murray, it can be shown that minimum pumping work and metabolic costs (i.e. contained volume) in a bifurcating channel network like that of cardiovascular systems, occur when the ratio ($R_D$) of the bifurcating junction inlet diameter ($d_i$) to the diameter of each of two equal outlets ($d_o$) is $2^{1/3}$ (referred to as Murray's Law). Larger values of R will reduce pressure drop at the expense of larger contained volume, or vice versa.

Two-dimensional versions of fractal distributors have been previously tested (H. Liu, P. Li, and J. Van Lew, "CFD study on flow distribution uniformity in fuel distributors having multiple structural bifurcations of flow channels," Int. J. Hydrogen Energy, vol. 35. no. 17, pp. 9186-9198, September 2010, the contents of which should be understood to be incorporated into this specification by this reference) and showed good flow distributing performance. Velocity variations across the nozzles were less than 5% of the mean value. The study found that maintaining a curved flow path and long channel length after the bifurcations both contributed to a uniform flow split. In particular, long channel sections should be used in early stages of the fractal manifold.

Nevertheless, prior fractal sequential flow distribution has been found to have the following limitations:
Comparatively higher pressure loss due to perpendicular bifurcation junctions;
Limited consideration of nesting of two streams with mixing and high outlet density;
Simple geometry leading to lower model complexity with very high outlet density; and
No evolution of sensitivity to channel blocking.

Limitations are addressed with a flow distribution system embodiment developed through the following:
Definition of proposed flow distribution system;
Numerical study;
Experimental evolution; and
Utilisation of additive manufacturing design considerations, in particular, Selective Laser Melting such as minimum manufacturable channel size, removal of powder and the like.

Additive manufacturing (AM) processes provide an opportunity to remove traditional manufacturability constraints and enable new design capabilities in flow distribution system applications which were previously not feasible due to manufacturing limitations. AM techniques produce 3D parts by joining accumulating part cross-sectional layers, enabling the manufacture of parts with geometric complexity beyond the capacity of conventional subtractive or formative manufacturing processes.

Selective Laser Melting (SLM) is one AM process that can be utilised for demanding fluid flow applications involving elevated pressures, temperatures and reactive flow media due to the ability to manufacture robust metal components (for example from Titanium, Stainless steel and Nickel alloys). SLM produces solid metal parts layer-by-layer using a laser beam to melt and fuse part cross-sections in strata of metal powder, processed in an inert atmosphere. SLM allows for the manufacture of complex internal cavities with curvilinear geometry, which are particularly compatible with the characteristics of fractal based flow distribution systems. However, it should be appreciated that other AM processes could also be used including (but not limited to) Stereolithography, Material Jetting, Selective Laser Sintering, or Direct Energy Deposition.

The present invention utilises the advantages of AM techniques to provide a new flow distribution system which combines two sequential flow division schemes to achieve high outlet flow uniformity and packing density, for two separate fluid inlet streams. With two fluid streams, mixing of fluids can be achieved with an additional dedicated and fluidly connected mixing section.

In view of the above, the fluid flow distribution system of the present invention can be designed to satisfy one or more of the following objectives:
Achieve a uniform distribution of a single flow inlet across multiple flow outlets with a square aspect ratio of outlet channels to feed downstream components with square proportions.
Allow for two independent fluid streams which can be mixed at the outlet in small volumes. The symmetry of fluid streams is to be maintained to achieve equal flow conditions and to simplify design analysis requirements.
Provide sufficient spacing between the independent fluid streams to allow for wall thicknesses structural requirements.
Allow additive manufacture without support structures by limiting surface inclination angles to 30 degrees from a horizontal build platform.
Limit frictional pressure loss by reducing abrupt flow path transitions and maximum feasible channel diameters.
A flow area transfer ratio (ratio of total inlet to total outlet flow area) of $R_F=1$ to conserve cross-sectional are along the flow path and minimize velocity variations.
Accommodates high flow distribution densities.

As shown in FIGS. 2 to 9, the resulting fluid flow distribution system of the present invention comprises a 3-dimensional nested structure of two intertwined bifurcated fractal structures. The distributor has a 3-dimensional layout which enables larger channel diameters in a given footprint area for reduced flow resistance and increased the ability to nest two separate distribution streams without interference. Additionally, the distributor is designed with surface inclination angles that are degrees to allow the distributor to be manufactured using SLM without requiring support structures.

Figure 1:
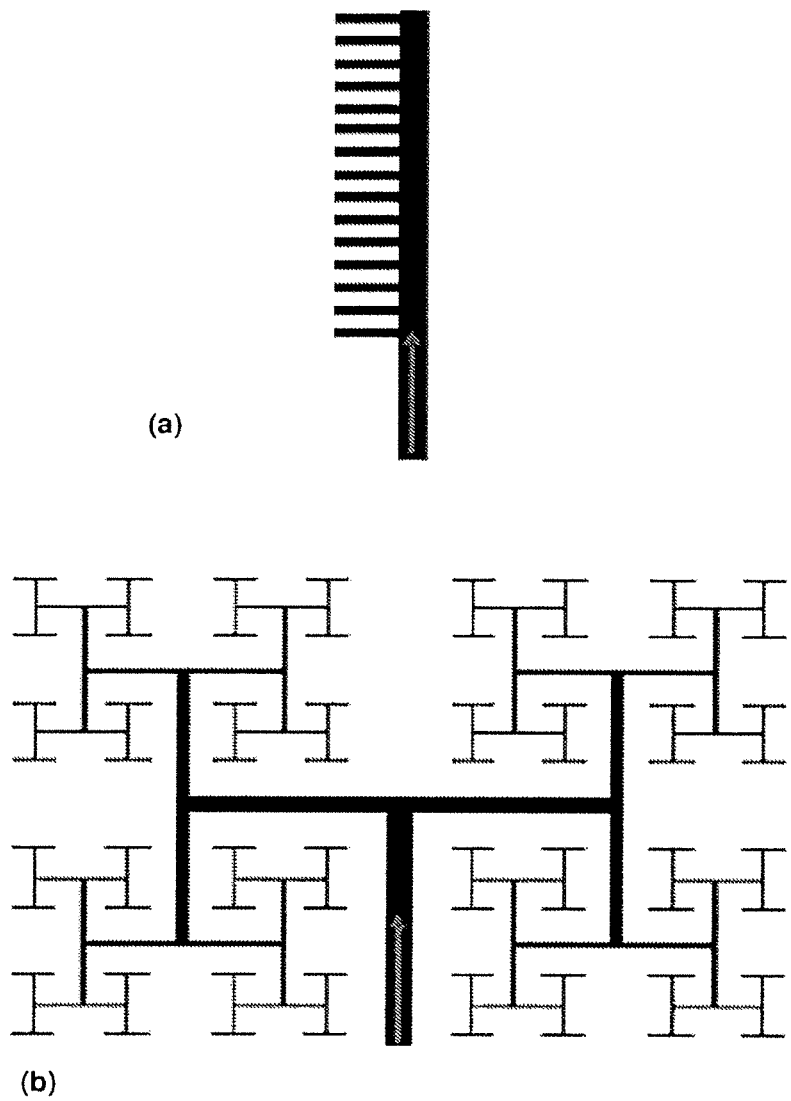
FIG. 1 provides general illustrations of the two general flow distribution schemes: (a) Parallel; and (b) Sequential fractal type.

FIGS. 2 and 3 show in more detail the configuration of a fluid transporting fractal 100 which forms part of a fluid flow distribution system 200 according to the present invention. This fluid transporting fractal 100 comprises of a series of recursive bifurcation units 110 assembled in multiple stages. Each stage is designed by the bifurcation stage index j=[1, N] where N is the total number of bifurcation stages. Successive bifurcation units 110 are preferably rotated about the Z axis (as best shown in FIGS. 1(b), 3 and 5) by 90° relative to the previous stage, in order to enable symmetric flow resistance to the bifurcating flow. However, it should be appreciated that in other embodiments each fluid transporting fractal could be rotated about the Z axis by an angle of 90+/−30 degrees, more preferably 90+/−20 degrees, even more preferably 90+/−10 degrees and most preferably substantially 90 degrees relative to the previous stage whilst still maintaining a substantially symmetric flow resistance to the bifurcating flow. The degree that would not "substantially" affect uniform flow depends on the required level of flow uniformity.

Fractals are geometric structures that can be repeatedly subdivided into parts at varying scales, each of which exhibits repeating self-similarity by being exactly or approximately invariant under changes of scale due to dilations or contractions. These characteristics lead to unusual space-filling properties allowing fractal geometric structures to approach topologically higher dimensions than those which they are embedded in. For example, due to exhibiting repeating levels of detail at all scales, a fractal curve pattern can approach the space-filling capacity of a surface, despite the topological dimension of a curve and surface being limited to one and two, respectively. This space-filling property can be exploited in applications aiming to maximize flow distribution over an area.

Measurement of properties such as length in fractals provides no unique value due to repeating detail and dependency on measurement resolution. For this reason, characterising fractal properties and how geometric detail changes with changing scale leads to the concept of a fractal dimension (also known as Hausdorff Dimension), which is an index of complexity comparing how the detail in a fractal pattern changes with the scale at which it is measured. Unlike topological dimensions, the fractal dimension is not limited to integer values and is always greater than the topological dimension. The fractal dimension δ is determined (according to Equation (1) or (1A)), by the number of copies U, of the self similar object with repeating unit of detail, which arise when the repeating unit of detail is subject to a scaling factor of σ. Higher fractal dimensions typically signify higher complexity in the associated fractal pattern:

$$U = \sigma^{-\delta} \tag{1}$$

$$\delta = -\frac{\log(U)}{\log(\sigma)} \tag{1A}$$

Where:

σ: Scaling factor

δ: Fractal dimension

U: Number of new copies of an object after scaling

FIG. 2 shows a single recursive fractal flow path forming a fluid transporting fractal 100 designed according to the present invention. As illustrated, the flow path comprises a series of interconnected recursive units (defined in more detailed below) forming the illustrated flow path. The preferred form of the flow distribution system of the present invention includes H-shaped fractal units (FIG. 1(*b*)). The self-similar unit of detail which constitutes the repeating, scale-invariant structure of the fractal flow distribution system is an "H" shaped unit comprising of a stage j and j+1 bifurcation units (FIG. 2(*b*)). This arrangement has a corresponding fractal dimension δ=2. As shown in FIG. 2(*b*) each H-shaped recursive units 112 comprises two bifurcation stages 110 (stage j and j+1 bifurcation units) which form a fractal bifurcation stage The space-filling properties of fractals are utilised in the proposed fractal flow distribution system embodiment (FIGS. 2(*a*) and 2(*b*)). The flow distribution system of the present invention comprises recursive bifurcation units defined by the key parameters of height $H_j$, spacing $S_j$, inlet diameter $D_j$, outlet diameter $D_{j+1}$ and bifurcation angle $\theta_j$, where j denotes the bifurcation stage index (FIG. 2).

The flow distributor bifurcation units are defined by the key parameters of height $H_j$, spacing $S_j$, inlet diameter $D_{ji}$, outlet diameter $D_{jo}$ and bifurcation angle O for each bifurcation unit of stage j. The bifurcation inlet and outlet diameters of the unit shown in FIG. 2 for stage j are related by the ratio $R_{D_j}$ (Equation (2)). Due to inter-stage connectivity, the inlet diameter to stage j+1 is equal to the outlet diameter of bifurcation stage j, i.e. $D_{jo}=D_{(j+1)i}$. The diameter changes linearly between $D_j$ and $D_{j+1}$ to provide a gradual flow path transition and thereby reduced frictional fluid pressure losses.

$$R_{D_j} = \frac{D_{j_i}}{D_{j_o}} = \frac{D_{j_i}}{D(j+1)_i} \tag{2}$$

$R_{D_j}$: Ratio of bifurcation inlet to outlet diameters for stage j $D_{j_i}$: Inlet diameter for stage j [mm]

$D_o$: Outlet diameter for stage j [mm]

j: Bifurcation stage index;

j = [1, N] where N is total no. of bifurcation stages

Within the inherent geometric relationships of the fractal flow distribution system embodiment, achieving a uniform distribution of outlets in a square fill area with edge length L (FIG. 2 (*b*) where $L_x=L_y=L$) requires an even number of bifurcation stages, where the number of outlets ($O_N$) is given by equation (3).

$$O_N=2^N \tag{3}$$

Where: $O_N$: Number of outlets for a fractal flow distribution system with N total number of bifurcation stages, where N is always even Similarly, for a desired number of outlets, the number of required bifurcation stages is given by equation (4).

$$N=\log_2(O) \tag{4}$$

Furthermore, the bifurcation unit spacing S, i.e. the perpendicular projection length between the center of the inlet and outlet diameters of each bifurcation unit (see FIG. 2) can also be defined. The resultant unit spacing $S_N$ (FIG. 2(*a*)) for the final bifurcation stage N, is given by equation (5). In order to achieve a square outlet array, the bifurcation unit spacing needs to be conserved when transitioning between an odd and even stage index, and halved when transitioning between even and odd stages. As such the unit spacing for intermediate bifurcation stages $S_j$, is given by equations (6) and (7). The ratio of bifurcation unit spacing can also be specified by the scaling factor σ, where σ=½ in order to achieve a uniform distribution of outlet channels in a square outlet array as provide in equation (8).

$$S_N = \frac{L}{2^{(N/2+1)} - 2} \tag{5}$$

$$S_{j_e} = S_N \cdot 2^{(N-j_e)/2} \tag{6}$$

$$S_{j_\sigma} = S_N \cdot 2^{(N-j_\sigma-1)/2} \tag{7}$$

$$\frac{s_{j+2}}{s_j} = \sigma \tag{8}$$

$S_N$: Bifurcation unit spacing of final stage N [mm]

L: Outlet stage edge length [mm]

$S_j$: Bifurcation unit spacing of stage j [mm]

σ: Scaling factor, σ = 1/2 for a uniform outlet channel distribution in a square outlet array From a fractal analysis perspective, the self-similar unit of repeating detail (here referred to as the generator) for the proposed distributor is taken to be the set of bifurcating unit j and two associated branching units j+1 (as highlighted in FIG. 2A(ii) by the "H" dashed line on a projected two-dimensional unit connectivity schematic). The generator is self-replicated at each generator outlet channel and scaled by the scaling factor σ. As there are four generator outlet channels, each replication results in four copies of the self-similar generator object i.e. number of copies U=4. The associated fractal dimension δ, as defined by equation (1), depends on the scaling factor σ, applied to the generator. For small values of σ, the space-filling capacity of the resultant distribution of outlets is limited, for large values of σ, channel overlap and interference can occur (for example FIG. 2A shows a two-dimensional projection schematic of bifurcation unit interconnectivity with changing dimensions). For σ=½ the outlet channel distribution is uniformly distributed and δ=2 which signifies that the space-filling capacity of the associated fractal approaches that of an object with a topological dimension of 2 i.e. a surface.

For an odd number of flow distributor stages (i.e. $N_O$, or if channel spacing is no longer conserved when transitioning between even and odd stages, the resultant outlet channel arrangement takes on either a non-uniform spacing, or a rectangular aspect ratio. If required for a particular application, a rectangular outlet channel aspect ratio can be achieved by applying the scaling factor σ to every bifurcation unit, rather than only every other bifurcation unit as in the square aspect ratio case (i.e. equation 8)). In this case the scaling factor is applied twice (i.e. $σ^2$) to the generator as it comprises of bifurcating unit j and two associated branching units j+1. The resulting two-dimensional projection schematic is shown in 2B for varying values of σ.

The bifurcation angle $θ_j$ (FIG. 2) is preferably between 30 and 60 degrees. The preferred bifurcation angle $θ_j$ is 35 degrees It should be appreciated that the bifurcation angle (unit split angle) is the inclination angle of the line between equal radii $r_j$ shown in FIG. 2A. Theta influences the degree of curvature of the bifurcation channel centerline. FIGS. 3(a) to 3(c) show three different channels constructed with different values of $θ_j$. As shown in FIG. 3, higher values of $θ_j$ lead to smaller values of radii $R_j$. With small $R_j$ (i.e. large $θ_j$) it may not be possible to create a lofted channel between inlet $d_{j\_in}$ and outlet $d_{j\_out}$ as the associated perimeter surface is not feasible. This occurs when the bend radii $R_j$, caused by a large $θ_j$, is smaller than the associated channel radii. Therefore $θ_j$ must be such that the resultant $R_j > 0.5*d_{j\_in}$ When also considering the additional wall thickness of channel, $t_j$, then: $θ_j$ must be such that $R_j > 0.5*D_{j\_in} + T_j$. Thus feasible: $R_j > D_j/2$; and infeasible: $R_j < D_j/2$. Small values of $θ_j$ lead to a more curved channel which increase bend losses in the flow. Additionally, as the channel becomes more horizontal it is more difficult to additively manufacture. Hence larger feasible values of $θ_j$ are preferred values of $θ_j$ between ~30-40 generally allow for a feasible channel loft which include a wall thickness $t_j$ between ~d/2 and d providing good structural strength.

The flow distribution system 200 and fluid transporting fractal 100 is also designed with a flow area transfer ratio of $R_F=1$ to conserve cross-sectional are along the flow path and minimize velocity variations. Additionally, the flow distribution system 200 of the present invention is also designed with an even number of flow distribution system stages (N=even number). For an odd number of flow distribution system stages, or if both odd and even stages have equal spacing, the resultant outlet channel arrangement takes on either a non-uniform spacing, or a rectangular aspect ratio which is undesirable for the objectives associated with the optimised design of a flow distribution system of the present invention. If a rectangular outlet channel aspect ratio is required for a given application, then the channel spacing can be determined in terms of single fractal dimension ratio.

Additionally, the flow distribution system is designed with a flow area transfer ratio (ratio of total inlet to total outlet flow area) of $R_F=1$ to conserve cross-sectional are along the flow path and minimize velocity variations. For each fluid transporting fractal, the total flow area ratio $R_a$ (as defined below) can be specified with different values:

$R_a = A_{out}/A_{in}$ = (sum of areas of all outlet channels at each outlet plane of stage)/(sum of areas of all inlet channels at each inlet plane of stage)

FOR:
  $R_a=1$: same flow area at each stage inlet and outlet. There should result in limited pressure drop in the device
  $R_a<1$: flow area reduces at the outlet thereby decreasing the total flow area with increasing number of stages. This increases pressure drop through the device and increases the flow velocity with each stage
  $R_a>1$: flow area increases at the outlet thereby increasing the total flow area with increasing number of stages. This reduces pressure drop through the device and decreases the flow velocity with each stage $R_a=1$ is generally preferred but it is not an absolute requirement. $R_a$ can be different if desired for a particular application given above trade-offs.

The above $R_d$ value can also be equivalently considered in terms of only the bifurcation unit inlet to outlet diameter ratio rather than area. In this case, there is a special ratio known as "Murrays" law which minimizes the contained volume in the channel and the pressure loss due to channel diameter. This is preferable when the total contained fluid volume in the device needs to be minimised. In this case Murrays law $R_d = D_{in}/D_{out} = 2^{1/3}$ As noted above, FIGS. 2 and 3 only illustrate the configuration of one fluid transporting fractal 100 of the flow distribution system of the present invention. A flow distribution system 200 of the present invention includes at least two intertwined fluid transporting fractals of this configuration as shown in FIGS. 5 to 8 designed to achieve high outlet flow uniformity and packing density, for one or two separate fluid inlet streams.

Referring to FIGS. 6 to 8, the flow distribution system 200 comprises a three-dimensional nested structure having a first fluid transporting fractal 210 and a second fluid transporting fractal 212. Each fluid transporting fractal 210, 212 has a fluid inlet 220, 222 which bifurcates to a plurality of fluid outlets 230, 232. As noted above, each fluid transporting fractal 210, 212 is configured to facilitate a fluid flow therethrough independent from a flow in the other fluid transporting fractal 210, 212. Each fluid transporting fractal 210, 212 extends along and about its own fluid flow axis Y-Y and Z-Z and also about and around a central axis X-X that extends between the fluid inlets and a plurality of fluid outlets of the overall flow distribution system 200. Each fluid transporting fractal 210, 212 is intertwined with the other fluid transporting fractal 210, 212. In order to facilitate this intertwined geometry, each fluid transporting fractal 210, 212 is positioned offset from the other fluid transporting fractal about the central axis X-X.

The fluid transporting fractals 210, 212 are intertwined in a positioned offset from the other fluid transporting fractal about the central axis X-X in order to position and pack the two fluid transporting fractals within the desired space. The flow axis Y-Y and Z-Z of each fluid transporting fractals 210, 212 are laterally and longitudinally spaced apart about the central axis and inclined by an angle G (a combination of the XY, YZ angles shown in FIG. 7) relative to the central axis X-X. This enables each fluid transporting fractal 210, 212 to bend or be angled away between 2 and 20 degrees, preferably between 4 and 10 degrees from the central axis X-X and longitudinally inclined between 2 and 20 degrees, preferably between 4 and 10 degrees from the central axis X-X to allow for clearance at assembly inlet without compromising inlet flow conditions.

The fluid outlets 230, 232 of each fluid transporting fractal 210, 212 and of the flow distribution system 200 as a whole are located and aligned in a single plane relative to the central axis X-X. In this plane, the fluid outlets 230, 232 are arranged in a square aspect ratio, in an even number array. As best shown in FIGS. 6 and 7, each fluid outlet 230, 232 from the first fluid transporting fractal 210 is located adjoining a fluid outlet 232 of the second fluid transporting fractal 212.

As described above, each fluid transporting fractals 210, 212 comprises of a series of recursive bifurcation units 110 (FIG. 2) assembled in an even number of stages, each bifurcation unit 110 comprising a Y-shaped bifurcated element which is fluidly connected to two successive bifurcation units, each successive bifurcation unit 110 being rotated relative to the central axis X-X by 90 degrees relative to the previous stage. These Y-shaped bifurcated units have an inlet channel 150 and two outlet channels 152, 154 which provide a curved fluid flow path between the inlet 150 and outlet 152, 154, typically forming an arch with the inlet 150 located at the peak thereof.

As shown in FIG. 6, in same embodiments each fluid transporting fractal 210, 212 can include a straightening section 240 is configured to align the flow conduits of the fluid transporting fractal from alignment with the flow axis Y-Y or Z-Z of that fluid transporting fractal, to the central axis and fluid outlet plane. The straightening section is followed by a straight section 242 which can be adjustable in length when required to recover flow conditions after straightening section 240.

Introducing a straight channel section between sequential bifurcation units allows the flow to recover to axisymmetric conditions after passing through the bifurcation bends which can introduce shear flow components into the flow profile. These shear components can cause asymmetry in distribution when the flow enters the next bifurcating stage. In such embodiments, the transition length ratio of each bifurcation unit is also an important consideration, where is the length between respective bifurcations in a first bifurcation unit and a subsequent bifurcation unit and D is the average outer diameter of the respective conduit extending between bifurcations in a first bifurcation unit and a subsequent bifurcation unit. It should be appreciated that the effect of L/D is quite small, with CFD showing that the standard deviation of outlet channel flow uniformity only decreased by ~2% when going from L/D=0 to L/D=20.

The design methodology followed to develop a flow distribution system of the present invention is shown in FIG. 4. The process of design starts with determining the desired throughput of the system, followed by arriving at the set of values of the dimensionless number (primarily Capillary number) and fluid physical properties. Once these data are available a channel geometry can be determined as set out below.

The fully drafted model is developed based on the required channel properties and flow splitter design parameters. As shown in FIGS. 4 to 8, the configuration of the proposed flew distribution system includes two intertwined flow channels. The dual independent channel pathways enable the uniform distribution of two independent flows in close proximity. This dual flow distribution system satisfies the following objectives:

Uniform flow distribution of two independent flows with high outlet channel packing density.

The symmetry of both channel pathways to provide equivalent flow conditions and reduced design effort, while allowing the option of asymmetric channel pathways if required.

Achieve a minimum separation distance between pathways such that any resultant wall thicknesses satisfy structural and manufacturability requirements.

Allow for the desired separation distance between the inlets of the two pathways such that: there is no interference between associated connection fittings, and the inlet positions are contained within the device footprint area such that multiple units may be adjoined without significant gaps.

Allow for a straight flow path at the channel pathway inlet prior to entering initial bifurcation stage, in order to avoid shear flow induced by bends which could affect bifurcation uniformity.

In order to satisfy the above design objectives, the proposed dual pathway flow distribution system is constructed from interweaved nesting of two single channel pathway fractal distributors (referred to as modules for brevity) as shown in FIG. 5(a). The modules are inclined at a transition plane and symmetrically mirrored around the outlet plane axis of symmetry (referred to as the outlet plane normal for brevity). The inclination is offset from the outlet plane by a distance $H_t$ along the transition plane normal, and is inclined about planes XZ and YZ as defined by the parameters $\theta_{t_{xz}}$ and $\theta_{t_{yz}}$, respectively. The angular offset parameters need to be specified such that interference of the two nested channel pathways is avoided. The potential for interference depends on several parameters including:

number of stages (N)

stage position of the transition plane (e.g. typically the transition plane is positioned at j=4 as in the embodiment depicted in the attached figures) and the associated bifurcation unit spacing $S_j$ Channel wall thickness $T_{ji}$ and $T_{jo}$ As such $\theta_{t_{xz}}$ and $\theta_{t_{yz}}$ need to be selected based on the specific values of the influential interference parameters. In general interference between two nested channel pathways should be avoided for the following:

$$0 \leq \theta_{t_{xz}} \leq 20 \text{ and } 0 \leq \theta_{t_{yz}} \leq 20$$

The inclination and offset enable high s.

The modules are located on the transition plane such that the axis of symmetry of the module (also referred to as the transition plane centre line) is linear offset by parameters $C_{t_u}$ and $C_{t_v}$.

The linear offset parameters $C_{t_u}$ and $C_{t_v}$ (also referred to as lateral and longitudinal offsets) need to be specified such that interference of the two nested channel pathways is avoided. The potential for interference depends on several parameters including:

number of stages (N)

stage position of the transition plane (e.g. typically the transition plane is positioned at j=4 as in the embodiment depicted in the attached figures) and the associated bifurcation unit spacing $S_j$ Channel wall thickness $T_{ji}$ and $T_{jo}$ As such $C_{t_u}$ and $C_{t_v}$ need to be selected based on the specific values of the influential interference parameters. In general interference between two nested channel pathways should be avoided for the following:

$$-\frac{S_j}{2} \leq C_{t_u} \leq \frac{S_j}{2} \text{ and } -\frac{S_j}{2} \leq c_{t_v} \leq \frac{S_j}{2}$$

The outlet plane comprises of a uniformly interspaced array of channel outlets for both modules. Located between the outlet and transition planes is an array of connecting channels which compensate for the inclined modules above, realigning the flow to the outlet plane normal. The connecting channels are tangential to the normal of the outlet and transition planes. This simplifies downstream design such as the addition of further fractal bifurcating stages.

For the embodiment in FIG. 5 the transition plane is positioned at the outlet of stage j=4 of the fractal flow distribution system, however the plane can be positioned at different stage locations if desired. Positioning at lower values of j results in fewer required connecting channels for realigning the flow, which decreases modelling effort as each channel has unique geometry. However, position the transition plane at lower values of j can also increase the required inclination plane angles in order to avoid interference between channel pathways, as upper stage units are nested comparatively closer than downstream units. Furthermore, this can also increase the size of the device for reasons explained below.

Turns in the connecting channels between the inclined transition plane and the horizontal outlet plane can introduce axial asymmetry in the flow path. Excess axial asymmetry in the flow subsequently entering a bifurcation unit can compromise the downstream uniformity of flow distribution. The recovery to uniform axisymmetric flow following deviations introduced by turns in the flow path is typically proportional to the length to diameter ratio of the associated fluid channel. For a given length to diameter ratio, the connecting channel length will increase when positing the transition plane at decreasing values of j due to the larger associated diameter. This in turn will increase the size of the fractal flow splitter embodiment. As such it is desirable to position the transition plane at larger values of j in order to minimise device packaging space. To balance the compromise between modelling effort, channel pathway interference and packaging space, the transition plane was positioned at the outlet of stage j=4.

Although a symmetric layout of channel pathways (as per FIG. 5(*a*)) achieves equivalent flow conditions and simplifies design effort (as analysis is only necessary for a single channel pathway) the layout can also be structured asymmetrically to achieve intentionally different flow conditions.

Additionally, further stages can be added to the fractal design embodiment in both single and dual channel pathway configurations in order to target desired application requirements.

Once designed, the flow splitter is then verified that it will evenly distribute the two phases prior to the point of contact.

Thereafter, the manufacturability of this device is checked. If the manufacturability is not satisfied the flow splitter parameter are adjusted as modifying the channel properties will not be ideal for the hydrodynamic characteristics of the system.

Taylor Flow Mixing Device

The flow distribution system of the present invention can also be used as a fluid flow distribution system for a Taylor flow mixing device. One embodiment of this application illustrated in FIGS. 11 and 12.

Taylor flow regime is easily developed and controlled in a single channel. However, a significant degree of maldistribution of flow can occur when multiple channels are used. The flow distribution system of the present invention can be used to provide uniform flow characteristics to each outlet channel, and thus provide each outlet channel with the same geometric and design parameter that govern the hydrodynamics of the system.

Taylor flow can be obtained from a large range of gas-liquid/liquid-liquid flow rates, which further provides flexible operating conditions. Secondly, the large surface area of the liquid-gas interface enhances the mass transfer. Taylor flow is one of the most important flow regimes within the microchannel. As shown in FIG. 9, Taylor flow is characterised by bubbles that occupy the cross-section of the channel and are separated by slugs. A thin film separates the gas bubbles from the surface of the reactor wall. Due to the recirculation within the liquid slugs, Taylor flow improves the G-L/L-L and G/L-L-S Heat and mass transfer (where G=gas and L=liquid).

The key challenge in producing multiple concurrent Taylor flow channels is the ability to generate even flow in all parallel channels, as shown in FIG. 10. Non-uniformity in such L-L, G-L and G-L-S systems at mille to microscale devices can be detrimental to such concurrent flow configurations.

The Taylor flow device of the present invention couples the previously described flow distribution system with a purpose-built mixer stage which uniformly mixes the two fluid flow stages to form a Taylor flow comprising those two fluids. As shown in FIGS. 11 and 12, a Taylor flow device 300 according to the present invention comprises the above-described flow distribution system 200 is coupled with a subsequent mixing unit 301 to mix the two flows to form a Taylor flow.

With reference to FIGS. 11 and 12, there is provided a Taylor flow mixing unit 300, comprising an inlet zone 310 comprising two inlets 315, 320. Each of the two inlets 315, 320 receives a fluid that is either G-L or L-L or G-L-S. Each of the fluids (A & B) then flows into the distribution zone 200 via the separate fluid transporting fractals 322 and 323 in which the main distribution channel of each is progressive split to successively smaller channels (fluid A: 330, 335) in TWO division stages in FIG. 11 and FIG. 12. This splitting results in the number of channels per unit area becoming larger in the flow direction (i.e. increased cell density). Preferably, the net cross-section area in the distribution zone remains substantially constant such that the mean velocity of the fluid within the distribution channels remains substantially constant.

The distribution zone 200 is preferably formed from an additive manufacturing process, such as selective laser melting. The distribution zone 200 preferably comprises a plurality of tubular channels constructed of a suitable metal, such as a steel alloy, titanium, titanium alloy or similar. This additive manufactured construction of the distribution zone 200 enables accurate and stable channel wall dimensions.

The distribution zone 200 splits the flow from the inlets 315, 320 to create a total of 16 distribution channels for the fluid which feed into the mixing zone. Each of the 16 distribution channels for fluid A are paired with a distribution channel for fluid B, with the fluids coming in contact with each other at a flow merge section 365. The flow merge section 365 comprises an intersection between the two distribution channels, where each distribution channel for fluid A merges into the distribution channel for fluid B. This intersection comprises a conduit merge, where the first conduit forming the distribution channel for fluid A merges into the second conduit forming the distribution channel for fluid B at a selected angle or entry or merge. That angle of entry a can be between 0 to 180 degrees, preferably between 45 and 90 degrees. However, the two most commonly used angles α are 90 and 45 degrees, however, there are variants, depending on the viscosity and surface tension of working fluids. The inlet length L to diameter D ratio of the channels is controlled to promote uniform plug flow, particularly in the channels prior to the flow merge section 365 as shown in FIG. 12(b).

In order to generate a Taylor flow at the merge, it has been found that the key parameters required of the flow in each distribution channel at the merge point is capillary number which can range anywhere between 0.001 to 0.2, Reynolds number from 10 to 1500, and channel size from microns to 2 to 3 mm.

The illustrated Taylor flow mixing device 300 generates and even flow that is spatially aligned and has even flow outlets from the flow distribution system that are nested with large cell density.

It should be appreciated that this Taylor flow mixing device 300 can be used in a variety of applications, including (but not limited to) Liquid-liquid extraction (LLE) for mixing two immiscible liquids.

Monolithic Reactor

The flow distribution system 200 of the present invention can also be used as a fluid flow distribution system for a monolithic reactor 400. One embodiment of this application illustrated in FIG. 13.

With reference to FIG. 13, there is provided a reactor 400, comprising an inlet zone 410 comprising two inlets 415, 420. Each of the two inlets 415, 420 receives a reactant (for example methane or oxygen). Each of the reactants (A & B) then flows into a distribution zone 418 of the reactor 400 via the separate fluid transporting fractals 422 and 423 in which the main distribution channel of each fluid transporting fractal 422 and 423 is progressive split to successively smaller channels (reactant A: 430, 435, 440 445). This splitting results in the number of channels per unit area becoming larger in the flow direction (i.e. increased cell density). In the illustrated embodiment, there are three splitting stages in distribution zone 1 (422). Preferably, the net cross-section area in the distribution zone 418 remains substantially constant such that the mean velocity of the reactant within the distribution channels remains substantially constant.

Distribution zone 1 (422) preferably comprises a plurality of tubular channels constructed of a suitable metal, such as a steel alloy. Distribution zone 1 (422) interfaces distribution zone 2 (432) which is a monolithic structure, typically made from a ceramic-based material. Distribution zone 2 further splits the four distribution channels from distribution zone 1 (422) to create a total of eight distribution channels for the reactant which feed into the mixing zone 452.

The monolithic construction of the distribution zone 2 enables accurate and stable channel wall dimensions. The length L to radius R ratio of the channels is controlled to promote uniform plug flow, particularly in the channels in direct communication with the mixing channels 460.

Each of the eight distribution channels for reactant A and paired with a distribution channel for reactant B, with the reactants coming in contact with each other at the start of the mixing zone 452. The mixing zone 452 has a number of baffles 470 which promote radial mixing of the reactants thereby promoting a high mixing efficiency.

The mixed reactants from each mixing channel 460 are then diverted into the reactor zone 472 which includes two reaction channels 480, with the reduction of the channel diameter restricting dispersion of the mixed reactants, thereby promoting a consistent flow velocity profile within the reaction channels 480. The mixed reactants come into contact with a catalyst (e.g. reforming catalyst) which is impregnated into internal walls of the reaction channels 480 creating a reaction product (e.g. $CO_2$, $H_2$ and/or $H_2O$) which exits the reactor 400 along with Unreacted reactants.

Online Monitoring of Oil Content in Polluted Waters

Another application is to use the flow distribution system of the present invention in a system for online monitoring of oil content in polluted waters (Produced water, for example). More specifically, oil in water samples, with oil either in simple dispersed state or in complicated emulsion state can be transferred to, and treated through the flow distribution system of the present invention, where organic oil components will be extracted into an organic solvent using a Liquid-liquid extraction (LLE) as explained above in relation to the Taylor flow device. The extraction process is followed by determination of oil concentration with different oil in water detectors based on different operating principles, which can be, but not limited to, colorimetric, Infrared or fluorescence method.

EXAMPLES

Example 1

Parametric Study of a Flow Distribution System 1.1 Introduction

Equal splitting and distributions of a fluid flow to feed numerous downstream processes or reactors simultaneously is a challenge and key consideration in many chemical engineering process designs. A fluid flow distribution system has been developed with an aim to subdivide a single flow stream equally into 64 sub-streams, and deliver the divided flow to a matrix of regularly spaced nozzles downstream.

The fluid flow distribution system design is based on successive branching of channels and division of the fluid flow. A large number of channels bifurcations are connected in series such that they split the flow according to the scheme shown in Table 1.

TABLE 1

Number of divided flow streams as produced by splitting the flow streams from the previous stage.

| Bifurcation stage | Number of stage outlet channels |
|---|---|
| 1 | 2 |
| 2 | 4 |
| 3 | 8 |
| 4 | 16 |
| 5 | 32 |
| 6 | 64 |

The key objective of this study is to establish a range over which this flow splitting approach can produce a satisfactory flow distribution. Parameters considered include:
1. Flow Reynolds number (Re);
2. Spacing between the upstream and downstream bifurcations, i.e. transition channel length (L); and
3. Channel wall surface roughness (h).

1.2 Geometric Design

The fluid flow distribution system considered in this study was designed to equally split a gas/liquid flow from a 20 mm diameter channel stage 1 inlet channel and feed it to 64 individual nozzles downstream, each 2.5 mm in diameter (stage 6 outlet channel diameter). Note the feed channel cross-sectional area, i.e. 314 mm², is conserved at the outlets of the fluid flow distribution system, i.e. 64×4.91 mm²=314 mm². This helps minimise local flow acceleration during bifuraction and thus maintain a stable flow velocity throughout the fluid flow distribution system. The geometry of the fluid flow distribution system is shown in FIG. 6.

A key consideration in the design of the present fluid flow distribution system is its ability to couple with a second unit in a mixer application to act as a feeder. In such an operation, two separate flow streams are split and discharged through two interleaved matrices of regularly spaced nozzles. The fluid flow distribution systems are arranged such that each individual nozzle is located right next to its mixing partner that supplies a different fluid species. This is shown in FIG. 5. This placed a strict requirement on the location and orientation of the channel bifurcations so the two units can be 'nested' together. This also limited the maximum number of split stages in a unit.

1.3 Test Program

The present study considers the effects of the following parameters on flow splitting:
1. Flow Reynolds number (Re);
2. Transition channel length ($L_T$), i.e. the length between respective bifurcations in a first bifurcation unit and a subsequent bifurcation unit; and
3. Channel wall surface roughness (h).

The parameter ranges tested are summarised in Table 2.

TABLE 2

Parameter ranges tested in this study.

| Parameter | Values |
|---|---|
| Reynolds number (Re) | 300, 10000, 100000 |
| Transition length ($L_T/D$) | 0, 10, 20 |
| Surface roughness (h, μm) | 0, 20, 50, 100, 200, 300 |

Uniformity in the distribution of fluid flow amongst all outlet channels is quantified by the spread of nozzle mass flow rates, i.e. the variance $\sigma^2$. For the ease of comparison across different flow cases, $\sigma^2$ is normalised by the square of the mean mass flow rate μ for a given case.

Preliminary simulations have found that the fluid flow distribution system geometry as seen in FIG. 1 produced less than optimal flow split. In fact, better splitting was achieved by adding straight channel sections between the bifurcations, thereby increasing the transition length ($L_T$). The present study will thus use $L_T/D_i=10$ as the baseline case. $D_i$ refers to channel diameter for a given stage i. It is noted that the channel diameters decrease with stage, so as to maintain a constant total cross-sectional area along the device.

1.4 Modelling Approach

Fluid dynamics calculations were performed for the fluid flow distribution system using ANSYS CFX-15.0. Domain discretization of the fluid flow distribution system geometry was based on a uniform wall cell thickness of 0.1 mm. This produced a $y^+$ value of <10 which falls within the linear region of the log-law of the wall. For Re≥10000, turbulence was resolved using a k-ε turbulence model with corrections for streamline curvatures. At Re=300, laminar flow regime was assumed.

In single fluid simulations, oxygen at 500° C., 10 bar was used as a working medium. This was chosen to reflect operating conditions expected in a typical methanol synthesis reactor. Heat transfer and effects of compressibility were not considered, i.e. the flow was modelled as being isothermal.

Mass flow rate ($\dot{m}$) at the inlet was calculated from the Reynolds number set for the run:

$$\dot{m} = \frac{\pi}{4}\text{Re}\cdot\mu\cdot D$$

where μ is the dynamic viscosity of the working fluid; D is the diameter of the inlet channel which is 20 mm in the present study.

With reference to FIGS. 2, 7 and 8, the design parameters for each run are summarised in the table (Table 3) below:

TABLE 3

Design parameters for flow distribution system design variants

| Parameter | | | | DESIGN ID #1 | #2 | #3 | #4 | #5 | #6 | #7 |
|---|---|---|---|---|---|---|---|---|---|---|
| No. of stages | | | N | | | | 6 | | | |
| Unit Diameters (D) [mm] | Stage 1 | Inlet | D1_in | | | | 20.000 | | | |
| | | Outlet | D1_out | | | | 14.142 | | | |
| | Stage 2 | Inlet | D2_in | | | | 14.142 | | | |
| | | Outlet | D2_out | | | | 10.000 | | | |
| | Stage 3 | Inlet | D3_in | | | | 10.000 | | | |
| | | Outlet | D3_out | | | | 7.071 | | | |
| | Stage 4 | Inlet | D4_in | | | | 7.071 | | | |
| | | Outlet | D4_out | | | | 5.000 | | | |
| | Stage 5 | Inlet | D5_in | | | | 5.000 | | | |
| | | Outlet | D5_out | | | | 3.536 | | | |
| | Stage 6 | Inlet | D6_in | | | | 3.536 | | | |
| | | Outlet | D6_out | | | | | | | |
| | | SIZING | | | | | 2.500 | | | |
| Unit height = H * D_in [mm] | H Multiplier | | H | 2 | 1.5 | 3 | 3 | 3 | 2 | 2 |
| | S Multiplier | | S | 2 | 2 | 2 | 2 | 2 | 2 | 2 |
| Unit split angles [deg] | Stage 1 to 6 | | A | Ave | Min | Max | Min | Max | Ave | Ave |
| Flow straightener parameters | YZ plane inclination | [deg] | YZ_angle | 4 | 4 | 4 | 4 | 4 | 4 | 4 |
| | XY plane inclination | [deg] | XY_angle | 8 | 8 | 8 | 8 | 8 | 8 | 8 |

TABLE 3-continued

Design parameters for flow distribution system design variants

| | Parameter | | | #1 | #2 | #3 | #4 | #5 | #6 | #7 |
|---|---|---|---|---|---|---|---|---|---|---|
| | Straight section height | [mm] | Straight_H | 5 | 5 | 5 | 5 | 5 | 0 | 25 |
| Height [mm] | Connector | | | 25 | 25 | 25 | 25 | 25 | 25 | 25 |
| | TOTAL | | | 165 | 131 | 235 | 235 | 235 | 160 | 185 |

DESIGN ID spans #1–#7.

1.5 Results

The overall results of the parametric study are provided in Table 4:Table 4: Parametric study for flow distribution system design variants

TABLE 4

Parametric study for flow distribution system design variants

| | Parameter | | | 1 ASU1.0-1 | 2 ASU1.0-2 | 3 ASU1.0-3 | 4 ASU1.0-4 | 5 ASU1.0-5 | 6 ASU1.0.6 | 7 ASU1.0-7 |
|---|---|---|---|---|---|---|---|---|---|---|
| Stages | | | N | 6 | 6 | 6 | 6 | 6 | 6 | 6 |
| Unit Diameters (D) [mm] | Stage 1 | Inlet | D1_in | 20.00 | 20.00 | 20.00 | 20.00 | 20.00 | 20 00 | 20 00 |
| | | Outlet | D1_out | 14.14 | 14.14 | 14.14 | 14.14 | 14.14 | 14.14 | 14.14 |
| | Stage 2 | Inlet | D2_in | 14.14 | 14.14 | 14.14 | 14.14 | 14.14 | 14.14 | 14.14 |
| | | Outlet | D2_out | 10.00 | 10.00 | 10.00 | 10.00 | 10.00 | 10.00 | 10.00 |
| | Stage 3 | Inlet | D3_in | 10.00 | 10.00 | 10.00 | 10.00 | 10.00 | 10.00 | 10.00 |
| | | Outlet | D3_out | 7.07 | 7.07 | 7.07 | 7.07 | 7.07 | 7.07 | 7.07 |
| | Stage 4 | Inlet | D4_in | 7.07 | 7.07 | 7.07 | 7.07 | 7.07 | 7.07 | 7.07 |
| | | Outlet | D4_out | 5.00 | 5.00 | 5.00 | 5.00 | 5.00 | 5.00 | 5.00 |
| | Stage 5 | Inlet | D5_in | 5.00 | 5.00 | 5.00 | 5.00 | 5.00 | 5.00 | 5.00 |
| | | Outlet | D5_out | 3.54 | 3.54 | 3.54 | 3.54 | 3.54 | 3.54 | 3.54 |
| | Stage 6 | Inlet | D6_in | 3.54 | 3.54 | 3.54 | 3.54 | 3.54 | 3.54 | 3.54 |
| | | Outlet | D6_out | 2.50 | 2.50 | 2.50 | 2.50 | 2.50 | 2.50 | 2.50 |
| | | | SIZING PARAMETER | | | | | | | |
| Flow straightener parameters | YZ plane | [deg] | YZ_angle | 4.00 | 4.00 | 4.00 | 4.00 | 4.00 | 4.00 | 4.00 |
| | XY plane | [deg] | XY-angle | 8.00 | 8.00 | 8.00 | 8.00 | 8.00 | 8.00 | 8.00 |
| | Rotation | [deg] | Rotation | 0.50 | 0.50 | 0.50 | 0.50 | 0.50 | 0.50 | 0.50 |
| | X planar offset | [mm] | offset_X | 0.00 | 0.00 | 0.00 | 0.00 | 0.00 | 0.00 | 0.00 |
| | Y planar offset | [mm] | offset_Y | 2.25 | 2.25 | 2.25 | 2.25 | 2.25 | 2.25 | 2.25 |
| | Straightener | [mm] | PlaneOffset | 20.00 | 20.00 | 20.00 | 20.00 | 20.00 | 20.00 | 20.00 |
| | Straight section height | [mm] | Straight_H | 5.00 | 5.00 | 5.00 | 5.00 | 5.00 | 5.00 | 5.00 |
| | Wall thickness | [mm] | Wall_t | 2.00 | 2.00 | 2.00 | 2.00 | 2.00 | 2.00 | 2.00 |
| Height [mm] | Connector | | | 25.00 | 25.00 | 25.00 | 25.00 | 25.00 | 25.00 | 25.00 |
| | TOTAL | | | 165.00 | 131.00 | 235.00 | 235.00 | 235.00 | 160.00 | 185.00 |
| | | | RESULTS | | | | | | | |
| Stages simulated | | | N | 4 | 4 | 4 | 4 | 4 | 4 | 4 |
| Surface roughness, Rz [μm] | | | Z | 30 | 30 | 30 | 30 | 30 | 30 | 30 |
| Reynolds number | | | Re | 1.00E+04 | 1.00E+04 | 1.00E+04 | 1.00E+04 | 1.00E+04 | 1.00E+04 | 1.00E+04 |
| Outlet flow average [kg/s] | | | Q | 2.71E−05 | 2.71E−05 | 2.71E−05 | 2.71E−05 | 2.71E−05 | 2.71E−05 | 2.71E−05 |
| Outlet flow Std. Dev. kg/s] | | | Q_σ | 4.4253E−07 | 5.77E−07 | 3.8015E−07 | 4.10419E−07 | 3.16337E−07 | 4.6111E−07 | 3.7303E−07 |

1.6 Reynolds Number Effect

Reynolds number is one of the most widely used dynamic similarity parameters in studying flows inside a channel. It is generally accepted that Re=2100 [1] is a critical value below which the flow is laminar. The laminar-turbulent transition can be delayed up to Re=100,000 by minimising ambient disturbances in controlled experiments. This is, however, unlikely to happen inside the fluid flow distribution system during its routine operation.

The normalised mass flow variances, as well as the associated pressure drops for the three Reynolds numbers tested, are shown in Table 4. At low flow velocity and hence low Re (i.e. Re=1500 case), the fluid flow distribution system distributes the flow evenly across all nozzles. The normalised variance is 5.03E-5 which implies a standard deviation of 0.71%. Assuming the distribution of the flow follows a normal distribution, mass flows through 95% of the nozzles then lie within ±1.42% from the mean value. It is worth noting that, at even lower Reynolds number, the flow velocity inside the channel can fall far below 0.44 m s$^{-1}$. The fluid flow distribution system can then become susceptible to downstream pressure fluctuations potentially leading to flow reversal. The operation of the fluid flow distribution system at low Reynolds numbers is therefore not recommended.

The normalised variance reduced to 3.51E6 as the flow moves into the turbulent regime (i.e. Re=10000 case). A further increase in the flow velocity by an order of magnitude (i.e. Re=100000 case) leads to a sharp rise in the normalised variance, indicating a trend towards non-uniform flow distribution. This mainly caused by the strong secondary motion that is set up as the fast flow moves through curved channel section The associated pressure drop increases moderately within 1500<Re<10000 and rises sharply as Re approaches 100000.

TABLE 5

Reynolds number effect on flow distribution and pressure drop

| Re | Superficial Inlet Velocity [m s$^{-1}$] | Normalised $\sigma^2$ [—] | Pressure drop [Pa] |
| --- | --- | --- | --- |
| 1500 | 0.44 | 5.03E−5 | 60 |
| 10000 | 2.20 | 3.51E−6 | 65 |
| 100000 | 22.0 | 1.38E−3 | 1301 |

1.7 Effect of Transition Length

At Re=10000, adding a short straight channel section downstream of every channel bifurcation significantly improved uniformity in nozzle flow distribution as seen in Table 6. Compared to the $L_T/D=0$ case, the normalised variance for the $L_T/D=10$ case lowered the normalised variance by almost two orders of magnitude at the expense of more pressure drop. Further increasing the transition channel length leads to more pressure drop without any improvement in flow distribution.

Predicted gas streamlines for these cases are shown in FIG. 14. Outside of the bifurcations, flow velocities largely remain close to 2.2 m s$^{-2}$ for all cases. This is directly due to the preservation of cross-sectional areas along their lengths.

TABLE 6

Effect of transition length on flow distribution and pressure drop

| Transition length ($L_T/D$) [—] | Normalised $\sigma^2$ [—] | Pressure drop [Pa] |
| --- | --- | --- |
| 0 | 6.30E−4 | 33 |
| 10 | 3.51E−6 | 65 |
| 20 | 2.38E−5 | 96 |

1.8 Effect of Surface Roughness

At Re=10000 and with $L_T/D=10$, a slight increase in surface roughness to 20 μm has a weak influence on the uniform flow distribution (Table 7). The magnitudes of change in both the normalised variance and pressure drop are minor or negligible. Increasing the surface roughness to 50 μm produced a less uniform flow distribution and a higher pressure drop. Surface roughness in an object built by selective laser melting (SLM) technique is typically within 20 μm and 30 μm.

TABLE 7

Effect of surface roughness on flow distribution and pressure drop

| Surface roughness (h) [μm] | Flow Distribution Standard Deviation [%] | Pressure drop [Pa] |
| --- | --- | --- |
| 0 | 0.19 | 65 |
| 20 μm | 0.19 | 65 |
| 50 μm | 0.20 | 66 |
| 100 μm | 0.24 | 76 |
| 200 μm | 0.24 | 79 |
| 300 μm | 0.21 | 82 |

Surface roughness has a positive impact on surface area at higher values but is considered to not be a detrimental factor. It is noted that surface roughness is a parameter that needs to be taken into account in design considerations for pressure drop as it is inherently present when the flow distribution system is formed by Additive Manufacturing.

1.9 Conclusion

The above results indicated that the following key independent parameters govern fluid equidistribution through the flow distribution system:

Reynolds number does not appear to be constrained by a lower value but is preferably greater than 1000. The upper limit is >100,000;

Transition length ($L_T/D$) ratio has an optimal value of at least 5, preferably at least 10.

Surface roughness has a positive impact at higher values but does not appear to be a detrimental factor. It is considered that surface roughness is a parameter that needs to be factored into the design of the flow distribution system due to the inherent surface roughness formed by manufacturing the flow distribution system using 3D printing.

Example 2

Taylor Flow Mixing Device—Liquid-Liquid Extraction Experiments

Liquid-liquid extraction (LLE) separates the compounds based on the differences in their relative solubilities in two immiscible liquids. The conventional process involves mixing of two liquid phases, maintaining the droplets or films of the dispersed phase, and subsequently separating the two phases from each other. The most commonly used device to perform this separation is the mixer-settler. The device primarily mixes the two phases and then uses gravity to separate the two layers of the fluids. "Taylor flow in capillary channels" can be used to enhance the performance characteristics of the system by maximizing the interfacial contact area and reducing the non-uniformity.

An example of Liquid-liquid extraction (LLE) applied to the onboard analysis of hydrocarbon for oil and gas exploration industry demonstrates the advantages of the continuous LLE system that can be scaled up or scaled out as desired. One of the major issues with the onboard analysis of hydrocarbons from seawater is the cost and (time-consuming, uses large quantities of solvent) and risk associated with sample preparation/extraction. Typically, samples of seawater are extracted with organic solvents using wet chemistry techniques. These procedures are time-consuming and often require large amounts of solvent. Ideally, this using the new device this process would be automated, thus saving the precious time of scientific staff aboard a vessel. This is particularly relevant on smaller vessels where laboratory and cabin space is limited, thus necessitating cross-skilling of the science personnel on board and reducing the time available to complete each task. In addition, any reduction in the volumes of solvents used to perform liquid-liquid extractions is in line with the concept of "green" chemistry—a practice favoured by many oil and gas companies and analytical laboratories, to reduce the environmental impact of operations.

Single Channel Experiments:

In order to characterize the Taylor flow in the capillary channel, it is important to understand the effect of various geometrical and hydrodynamic parameters that govern the flow regime and consequently the mass transfer phenomena. Thus, a series of experiments were carried out to confirm the existence of the Taylor flow and its effect on the mass transfer characteristics on the extraction of 1-naphthalene from water into an organic phase (n-Hexane). The effect of the blend angle (Table 8.) was studied for two most preferred angles, i.e. 90 and 45, whereas the existence of the Taylor flow was studied for all the blend angles.

Experimental Methodology:

TABLE 8

Experimenal Parameters
Taylor flow device DOE

| Channel length | [mm] | 150 |
|---|---|---|
| Channel profile | | Circular |
| Channel diameter | [mm] | 1.5 |
| Blend angle | [deg.] | 15 30 45 60 75 90 105 120 135 150 165 |

FIG. 15(A) also shows a variety of single channel configurations used in the experiments detailed below.

Experiment 1 (90 Deg.):

The aim of this experiment was to check the reproducibility of the mass transfer performance.
 Analyte: Naphthalene in Milli-Q water.
 Solvent: n-hexane.
 Flow rate: 1 ml/min.
 Analyte collected using an Eppendorf channeitte into GC vials after each 5 minute increment and analysed on GC-MS Experiment 2 (90 Deg.):

Testing the extraction efficiency of the single channel device by recirculating the two liquids to check of the equilibrium value of the mass transfer efficiency.
 Analyte: Naphthalene in Milli-Q water.
 Solvent: n-hexane.
 Flow rate: 1 ml/min.
 Remaining reagents run through apparatus until entire 20 ml volume of each has passed through.
 Separated in a funnel and 1 ml of each removed from the system.
 Reagents re-circulated for a total of four cycles.
 n-hexane run through GC-MS to ascertain the amount of naphthalene extracted.

Experiment 3 (45 Deg.):

A repeat of experiment 1, using 45 degree single channel device. 4×5-minute increments tested.

Experiment 4 (45 Deg.):

A repeat of experiment 2—testing the extraction efficiency of the 45 degree single channel device by recirculating the two liquids 4 times.

Experiment 5:

Shake out: Testing the extraction efficiency of the traditional shake-out method for liquid-liquid extraction to act as a comparison with the extraction efficiency of the single channel devices.
 Analyte: 20 ml Milli-Q water containing naphthalene
 Solvent: 20 ml n-hexane.
 Measured volumes of water and hexane transferred to a separation funnel.
 Shaken for 2 minutes. Allowed to settle.
 1 ml hexane withdrawn into GC vial.
 Contents of separation funnel was shaken again for 2 minutes.
 Another 1 ml aliquot withdrawn.
 The process repeated until 4 shake-outs had been completed. Samples run on GC-MS Experiment 6 (45 Deg.):

Recirculation experiments run using a higher flow rate through the 45 degree single channel device.
 Analyte: Naphthalene in Milli-Q water.
 Solvent: n-hexane.
 Flow rate: 2 ml/min.
 Remaining reagents run through apparatus until entire 20 ml volume of each has passed through.
 Separated in separation funnel.
 1 ml of each removed from the system.
 Reagents re-circulated. A total of 8 cycles run.
 After recirculation, a 2-minute shake out was performed to extract any naphthalene remaining in the water. The hexane was removed (1 ml taken as a sample). Fresh hexane was introduced and the shake-out repeated, collecting 1 ml as a sample. All samples were run through GC-MS to ascertain the amount of naphthalene extracted.

Experiment 7 (45 Deg.):

Series of recirculation experiments run using a higher flow rate through the 45 degree single channel device.
 Analyte: Naphthalene in Milli-Q water.
 Solvent: n-hexane.
 Flow rate: 5 ml/min.
 Remaining reagents run through apparatus until entire 20 ml volume of each has passed through.
 Separated in separation funnel. 1 ml of each removed from the system.
 Reagents re-circulated. A total of 8 cycles run.
 After recirculation, 1×2-minute shake-outs performed as for experiment 8. All samples were run through GC-MS to ascertain the amount of naphthalene extracted.

Results:

It was seen from the experiments that the standard shake out method provided the extraction efficiency (defined as the ratio of the amount of Naphthalene in the final solvent to the original amount of the analyte), of about 30%, whereas after optimizing the flow rate the 45 degree angle channel provided near 100% extraction efficiency within experimental errors. It was also confirmed from FIGS. 15 B and C that the Taylor flow existed in all the channels with varying slug and bubble diameters with optimum parameters for 45 degree channels. FIG. 16 shows the extraction efficiencies for varying flow rates and time Example 3

Experimental Validation

Two sets of experiments were conducted to validate the CFD models and check for the equidistribution of the flow that can be achieved using the flaw distribution device 500 as shown in FIG. 17. in the first set of experiments, as illustrated in FIG. 18, the aim was to measure the flow rate from each channel of the multi-channel flow distribution device 500 having a configuration shown in FIG. 17 (and as Table 9 provide the list of experimental conditions that were tested and the corresponding field of view and residence time to ensure that the selected field of view is not too short or too long to capture velocity profile generated by the device in the submerged tank.

TABLE 9

Results

| Velocity m/s | Density kg/m$^3$ | diameter m | Area m$^2$ | Viscosity NS/m$^2$ | Reynolds number | Flow rate in each channel m$^3$/s | Number of channels | total flow rate m$^3$/s | Lpm l/min | Length of field of view m | Residence time sec |
|---|---|---|---|---|---|---|---|---|---|---|---|
| 0.1 | 1000 | 2.40E−03 | 4.52E−06 | 0.001 | 24000 | 4.52E−07 | 64 | 2.89E−05 | 1.74 | 3.00E−02 | 0.30 |
| 0.22 | 1000 | 2.40E−03 | 4.52E−06 | 0 001 | 52800 | 9.95E−07 | 64 | 6.37E−05 | 3.82 | 3.00E−02 | 0.14 |
| 0.3 | 1000 | 2.40E−03 | 4.52E−06 | 0.001 | 720.00 | 1.36E−06 | 64 | 8.68E−05 | 5.21 | 3.00E−02 | 0.10 | previously described above in detail). Water was delivered from a 20 L bucket to the device via a water delivery hose and centrifugal pump arrangement. A rotameter was used to measure total volumetric flow rate. Outlet flow rates from each of the 16 channels were measured by timing how long it took to fill a volumetric flask. Flow rate as set to 2 L/min and outlet was collected in 100 ml volumetric flask.

Calculated volumetric flow rate and velocity are shown in FIG. 19 and FIG. 20. Table 9 provides the quantitative data for all 16 outlets tested in this experiment. The calculated value of the standard deviation was 6.7% and the R-square was 0.92 showing that the flow was very uniform with only two channels providing some variance.

TABLE 9

Quantitative data for the Flow uniformity through volumetric flask method

| Channel | Time (sec) | ml/sec | error (i/avg(i)) | m/sec | Variance | Residual |
|---|---|---|---|---|---|---|
| 1 | 37.7 | 2.65 | 0.90 | 1.50 | −11.67% | 3.93E−02 |
| 2 | 37 | 2.70 | 0.91 | 1.53 | −10.00% | 2.89E−02 |
| 3 | 33.2 | 3.01 | 1.02 | 1.70 | 0.30% | 2.62E−05 |
| 4 | 33.3 | 3 00 | 1.01 | 1.70 | 0.00% | 1.54E−19 |
| 5 | 33.4 | 2.99 | 1.01 | 1.69 | −0.30% | 2.59E−05 |
| 6 | 34 | 2.94 | 0.99 | 1.66 | −2.06% | 1.22E−03 |
| 7 | 33.5 | 2.99 | 1.01 | 1.69 | −0.60% | 1.03E−04 |
| 8 | 33.6 | 2.98 | 1.01 | 1.68 | −0.89% | 2.30E−04 |
| 9 | 33.9 | 2.95 | 1.00 | 1.67 | −1.77% | 9.05E−04 |
| 10 | 33.1 | 3.02 | 1.02 | 1 71 | 0.60% | 1.05E−04 |
| 11 | 32.6 | 3.07 | 1.04 | 1.74 | 2.15% | 1.33E−03 |
| 12 | 33.3 | 3.00 | 1.01 | 1.70 | 0.00% | 1.54E−19 |
| 13 | 34.3 | 2.92 | 0.98 | 1.65 | −2.92% | 2.45E−03 |
| 14 | 32.9 | 3.04 | 1.03 | 1.72 | 1.22% | 4.27E−04 |
| 15 | 32.6 | 3.07 | 1.04 | 1.74 | 2.15% | 1.33E−03 |
| 16 | 32.9 | 3.04 | 1.03 | 1.72 | 1.22% | 4.27E−04 |

The second validation experimental runs were conducted using a Particle Image Velocimetry (PIV) to validate the CFD model. Schematic of the experimental set-up 520 is shown in FIG. 19. The basic set-up of the experiment involves first placing the test device into the submerged water tank and connecting it to the reservoir through a pump to recirculate water. Thereafter seeding particles are introduced into the water, which illuminates when exposed to the laser. The laser beam is introduced at known time intervals and images are captured. Upon processing the images, velocity field/vectors can be calculated and correlated back to the hydrodynamic regime in the so-called "field of view".

To validate the CFD model the same experimental set-up was modelled using a submerged tank using the given flow rates. The resultant velocity contours of PIV and CFD data are shown in FIG. 20. As it can be seen that the CFD model is validated with the very high accuracy (within ±5% error) and thus the results from the CFD can be used for design performance evaluation.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A flow distribution system for distributing and dividing the flows of at least two separate fluids, the flow distribution system comprising:
   a three-dimensional nested structure of at least two fluid transporting fractals comprising at least a first fluid transporting fractal and a second fluid transporting fractal, each fluid transporting fractal having a respective fluid inlet which bifurcates to a plurality of fluid outlets, each fluid transporting fractal being configured to facilitate a flow therethrough independent from a flow in the other fluid transporting fractal, each fluid transporting fractal extending along and about a central axis between the fluid inlet and the plurality of fluid outlets;
   wherein each fluid transporting fractal comprises of a series of recursive bifurcation units assembled in a selected number of stages, each bifurcation unit comprising a Y-shaped bifurcated element which is fluidly connected to two successive bifurcation units, each successive bifurcation unit being rotated relative to the central axis by an angle of between 60 and 120 degrees relative to a previous stage; each fluid transporting fractal is intertwined with another fluid transporting fractal;

each fluid transporting fractal is positioned offset from another fluid transporting fractal about the central axis and is arranged such that each fluid outlet from one of the fluid transporting fractals is located adjoining a fluid outlet of another fluid transporting fractal, and each fluid transporting fractal is centered about a flow axis which is laterally inclined relative to the central axis from greater than 0 to 20 degrees from the central axis and longitudinally inclined relative to the central axis from greater than 0 to 20 degrees from the central axis.

2. A flow distribution system according to claim 1, wherein the flow axis of each fluid transporting fractal is spaced offset from the central axis.

3. A flow distribution system according to claim 1, wherein the flow axis of each fluid transporting fractals is laterally offset and longitudinally spaced apart about the central axis relative to the central axis.

4. A flow distribution system according to claim 3, wherein the lateral offset C of the flow axis of each fluid transporting fractal from the central axis is between $$-\frac{S_j}{2} \le c_{t_u} \le \frac{S_j}{2}$$

wherein $S_j$ is the bifurcation unit spacing.

5. A flow distribution system according to claim 3, wherein the longitudinal spacing C of the flow axis of each fluid transporting fractal from the central x between $$-\frac{S_j}{2} \le C_{t_v} \le \frac{S_j}{2}$$

wherein $S_j$ is the bifurcation unit spacing.

6. A flow distribution system according to claim 1, wherein each fluid transporting fractal is centered about the flow axis which is laterally inclined relative to the central axis from between 4 and 10 degrees from the central axis and longitudinally inclined relative to the central axis between 4 and 10 degrees from the central axis.

7. A flow distribution system according to claim 6, wherein the respective inclines of each fluid transporting fractal are mirrored about the central axis.

8. A flow distribution system according to claim 1, wherein each fluid outlet is located in an outlet plane orientated relative to the central axis, preferably-perpendicular to the central axis and each fluid transporting fractal includes a transition conduit configured to direct and realign a path of the flow path therethrough of each transporting fractal into the outlet plane.

9. A flow distribution system according to claim 1, wherein a layout of a path of the flow therethrough of each fluid transporting fractal is symmetric relative to the central axis and flow axis of each respective fluid transporting fractal.

10. A flow distribution system according to claim 1, wherein each successive bifurcation unit is rotated relative to the central axis between 70 and 110 degrees relative to a previous stage.

11. A flow distribution system according to claim 1, wherein the fluid outlets are arranged in a square aspect ratio, in an even number array.

12. A flow distribution system according to claim 1, having a flow area transfer ratio equal to 1 through each of the stages of the flow distribution system.

13. A flow distribution system according to claim 1, wherein the fluid outlets have a distribution density ranging from 10000 to 15000 outlets per $m^2$.

14. A flow distribution system according to claim 1, having a downturn ratio of at least 50.

15. A flow distribution system according to claim 1, wherein each Y-shaped bifurcated element comprises an inlet channel and two outlet channels which provide a curved fluid flow path between the inlet and outlets thereof.

16. A flow distribution system according to any-preceding claim 1, wherein two fluidly connected and adjoining said bifurcation units form an H-shaped fractal unit.

17. A flow distribution system according to claim 1, wherein each bifurcation unit has a bifurcation angle $\theta_j$ of between 30 and 60 degrees.

18. A flow distribution system according to claim 1, having a bifurcation unit spacing $S_j$ (the perpendicular projection length between the center of the inlet and outlet diameters of each bifurcation unit) is conserved when transitioning between an odd and even stage index, and halved when transitioning between even and odd stages.

19. A flow distribution system according to claim 1, further including a mixer in which at least one fluid outlet front the first fluid transporting fractal is mixed with the fluid from at least one fluid outlet of the second fluid transporting fractal.

20. A method of designing a flow distribution system for distributing and dividing the flows of at least two separate fluids comprising a three-dimensional nested structure, the method comprising:

determining number of flow distribution system stages;

selecting a recursive bifurcation unit, comprising a Y-shaped bifurcated element which is fluidly connected to two successive bifurcation units to be assembled in the selected flow split stages; and assembling each successive bifurcation unit into two fluid transporting fractals having the selected number of flow distribution system stages, each fluid transporting fractal extending along and about a central axis between a fluid inlet and a plurality of fluid outlets, such that:

each successive bifurcation unit is orientated so that it is rotated relative to the central axis by an angle of between 60 and 120 degrees relative to the previous stage each fluid transporting fractal being configured to facilitate a flow therethrough independent from a flow in another fluid transporting fractal;

each fluid transporting fractal is arranged such that each fluid outlet from one of fluid transporting fractals is located adjoining a fluid outlet of another fluid transporting fractal; each fluid transporting fractal is intertwined with another fluid transporting fractal;

each fluid transporting fractal is positioned offset from the other fluid transporting fractal about the central axis, and each fluid transporting fractal is centered about a flow axis which is laterally inclined relative to the central axis from greater than 0 to 20 degrees from the central axis and longitudinally inclined relative to the central axis from greater than 0 to 20 degrees from the central axis.

* * * * *